(12) United States Patent
Steel et al.

(10) Patent No.: US 8,955,734 B2
(45) Date of Patent: Feb. 17, 2015

(54) BALL HOLE WELDING USING THE FRICTION STIR WELDING (FSW) PROCESS

(71) Applicant: Smith International, Inc., Houston, TX (US)

(72) Inventors: Russell J. Steel, Salem, UT (US); Scott M. Packer, Alpine, UT (US); Cary A. Roth, Spring, TX (US); Madapusi K. Keshavan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 14/046,769

(22) Filed: Oct. 4, 2013

(65) Prior Publication Data

US 2014/0034394 A1 Feb. 6, 2014

Related U.S. Application Data

(63) Continuation of application No. 12/629,201, filed on Dec. 2, 2009, which is a continuation-in-part of application No. 11/136,609, filed on May 23, 2005, now abandoned, and a continuation of application No.

(Continued)

(51) Int. Cl.
*B23K 20/12* (2006.01)
*B23P 15/28* (2006.01)
*E21B 10/08* (2006.01)
*E21B 10/22* (2006.01)

(52) U.S. Cl.
CPC ............. *E21B 10/22* (2013.01); *B23K 20/1225* (2013.01); *B23K 20/129* (2013.01)

USPC .......... 228/112.1; 228/2.1; 175/327; 175/331

(58) Field of Classification Search
USPC ................................ 228/2.1, 112.1
See application file for complete search history.

(56) References Cited

U.S. PATENT DOCUMENTS

| 3,726,350 A | 4/1973 | Pessier |
| 4,144,110 A | 3/1979 | Luc et al. |
| 4,445,791 A | 5/1984 | Klima |
| 5,460,317 A | 10/1995 | Thomas et al. |
| 5,611,479 A | 3/1997 | Rosen |
| 5,697,511 A | 12/1997 | Bampton |

(Continued)

FOREIGN PATENT DOCUMENTS

| EP | 0797043 A2 | 9/1997 |
| EP | 0810054 A1 | 12/1997 |

(Continued)

OTHER PUBLICATIONS

Office Action issued in corresponding U.S. Appl. No. 12/629,366; Dated: Sep. 1, 2010 (14 pages).

(Continued)

*Primary Examiner* — Devang R Patel
(74) *Attorney, Agent, or Firm* — Osha Liang LLP

(57) ABSTRACT

A roller cone drill bit includes a bit body, at least one leg extending downward from the bit body, a journal on each leg, and a roller cone mounted on each journal. A ball race is configured between each journal and roller cone, and a plurality of retention balls is disposed within each ball race. A ball hole extends from the back face of each leg to the ball race, and a ball hole plug fits within the ball hole. The ball hole plug is secured to the leg by a friction stir weld.

5 Claims, 21 Drawing Sheets

Related U.S. Application Data

11/090,317, filed on Mar. 24, 2005, now abandoned, which is a continuation of application No. 11/090,909, filed on Mar. 24, 2005, now Pat. No. 8,186,561.

(60) Provisional application No. 60/573,707, filed on May 21, 2004, provisional application No. 60/637,223, filed on Dec. 17, 2004, provisional application No. 60/652,808, filed on Feb. 14, 2005.

(56) References Cited

U.S. PATENT DOCUMENTS

| | | | |
|---|---|---|---|
| 5,713,507 | A | 2/1998 | Holt et al. |
| 5,718,366 | A | 2/1998 | Colligan |
| 5,769,306 | A | 6/1998 | Colligan |
| 5,794,835 | A | 8/1998 | Colligan et al. |
| 5,811,755 | A | 9/1998 | McGee et al. |
| 5,813,592 | A | 9/1998 | Midling et al. |
| 5,829,664 | A | 11/1998 | Spinella et al. |
| 5,957,006 | A * | 9/1999 | Smith .................. 76/108.2 |
| 5,971,247 | A | 10/1999 | Gentry |
| 5,971,252 | A | 10/1999 | Rosen et al. |
| 5,975,406 | A | 11/1999 | Mahoney et al. |
| 6,045,027 | A | 4/2000 | Rosen et al. |
| 6,045,028 | A | 4/2000 | Martin et al. |
| 6,050,474 | A | 4/2000 | Aota et al. |
| 6,050,475 | A | 4/2000 | Kinton et al. |
| 6,051,325 | A | 4/2000 | Talwar et al. |
| 6,053,391 | A | 4/2000 | Heideman et al. |
| 6,070,784 | A | 6/2000 | Holt et al. |
| 6,138,895 | A | 10/2000 | Oelgoetz et al. |
| 6,168,066 | B1 | 1/2001 | Arbegast |
| 6,168,067 | B1 | 1/2001 | Waldron et al. |
| 6,173,880 | B1 | 1/2001 | Ding et al. |
| 6,193,137 | B1 | 2/2001 | Ezumi et al. |
| 6,206,268 | B1 | 3/2001 | Mahoney |
| 6,607,119 | B2 * | 8/2003 | Engelhard et al. ......... 228/112.1 |
| 7,182,162 | B2 | 2/2007 | Beuershausen et al. |
| 7,350,600 | B2 | 4/2008 | Beuershausen et al. |
| 7,484,577 | B2 | 2/2009 | Overstreet et al. |
| 2005/0252341 | A1 | 11/2005 | Allen et al. |
| 2006/0032333 | A1 | 2/2006 | Steel et al. |
| 2006/0049234 | A1 | 3/2006 | Flak et al. |
| 2006/0175381 | A1 * | 8/2006 | Wang et al. ............. 228/112.1 |
| 2007/0163812 | A1 | 7/2007 | Overstreet et al. |
| 2008/0202817 | A1 | 8/2008 | Massey et al. |
| 2009/0044984 | A1 | 2/2009 | Massey et al. |

FOREIGN PATENT DOCUMENTS

| | | |
|---|---|---|
| EP | 0833097 A2 | 4/1998 |
| EP | 0867254 A1 | 9/1998 |
| EP | 0810056 A3 | 12/1998 |
| EP | 0888843 A1 | 1/1999 |
| EP | 0893189 A2 | 1/1999 |
| EP | 0893190 A2 | 1/1999 |
| EP | 0925964 A2 | 6/1999 |
| EP | 0928659 A1 | 7/1999 |
| EP | 0947280 A1 | 10/1999 |
| EP | 0810055 B1 | 12/1999 |
| EP | 0968788 A2 | 1/2000 |
| EP | 0985483 A2 | 3/2000 |
| EP | 0992314 A2 | 4/2000 |
| EP | 1 029 627 A1 | 8/2000 |
| EP | 1046453 A2 | 10/2000 |
| EP | 1048390 A2 | 11/2000 |
| EP | 1055478 A1 | 11/2000 |
| EP | 1057572 A2 | 12/2000 |
| EP | 1057573 A2 | 12/2000 |
| EP | 1057574 A2 | 12/2000 |
| EP | 1057575 A2 | 12/2000 |
| EP | 1057576 A2 | 12/2000 |
| GB | 2306366 A | 5/1997 |
| WO | 93/10935 A1 | 6/1993 |
| WO | 97/15462 A1 | 5/1997 |
| WO | 97/48517 A1 | 12/1997 |
| WO | 98/13167 A1 | 4/1998 |
| WO | 98/45080 A1 | 10/1998 |
| WO | 98/51441 A1 | 11/1998 |
| WO | 98/58759 A1 | 12/1998 |
| WO | 99/32254 A1 | 7/1999 |
| WO | 99/32255 A1 | 7/1999 |
| WO | 99/33597 A1 | 7/1999 |
| WO | 99/34951 A1 | 7/1999 |
| WO | 99/39861 A1 | 8/1999 |
| WO | 99/52669 A1 | 10/1999 |
| WO | 99/54081 A1 | 10/1999 |
| WO | 99/58288 A1 | 11/1999 |
| WO | 99/65637 A1 | 12/1999 |
| WO | 00/02698 A1 | 1/2000 |
| WO | 00/02699 A1 | 1/2000 |
| WO | 00/02704 A1 | 1/2000 |
| WO | 00/03818 A1 | 1/2000 |
| WO | 00/56497 A1 | 9/2000 |

OTHER PUBLICATIONS

Office Action issued in related U.S. Appl. No. 12/629,366; Dated Jan. 20, 2011 (13 pages).

\* cited by examiner

Hardness regions of FSP alloy ATS-34 steel

ATS 34-weld microstructure showing reduced grain size from FSP

ATS 34-weld microstructure showing high density of Martensite in microstructure.

Cutting edge orientation using the FSP region

ATS 34-weld microstructure showing base metal microstructure and large grain size (Annealed condition)

Planer view of surface of WC mixed region

FS mixing of WC powder (KS12 type) into steel

| Characteristic | Elements that exhibit strong characteristic behavior |
|---|---|
| Electrical Conductivity | Copper |
| Abrasion Resistance | Carbides (W, Si, etc..) Diamond, CBN, Nitrides, Oxides |
| Strength | Cobalt, Nickel, Martensitic formations in steel structures |
| Toughness | Nickel |
| Corrosion Resistance | Nickel, chrome, Molybdenum |
| High Thermal Conductivity | Copper |
| Low Thermal Conductivity | Cobalt, Titanium |
| Radiation Absorption | Silicon carbides, Boron carbides |

FIGURE 15

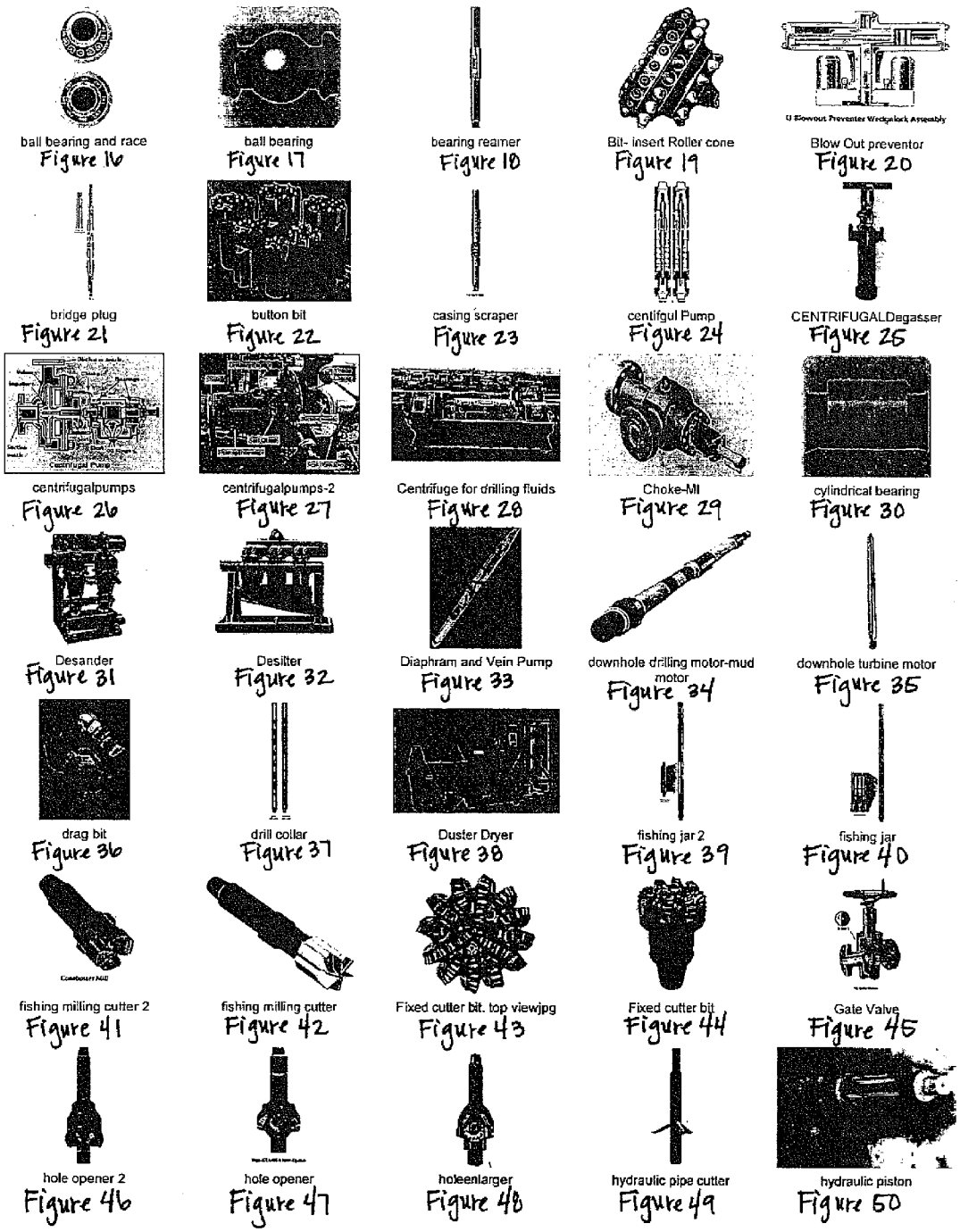

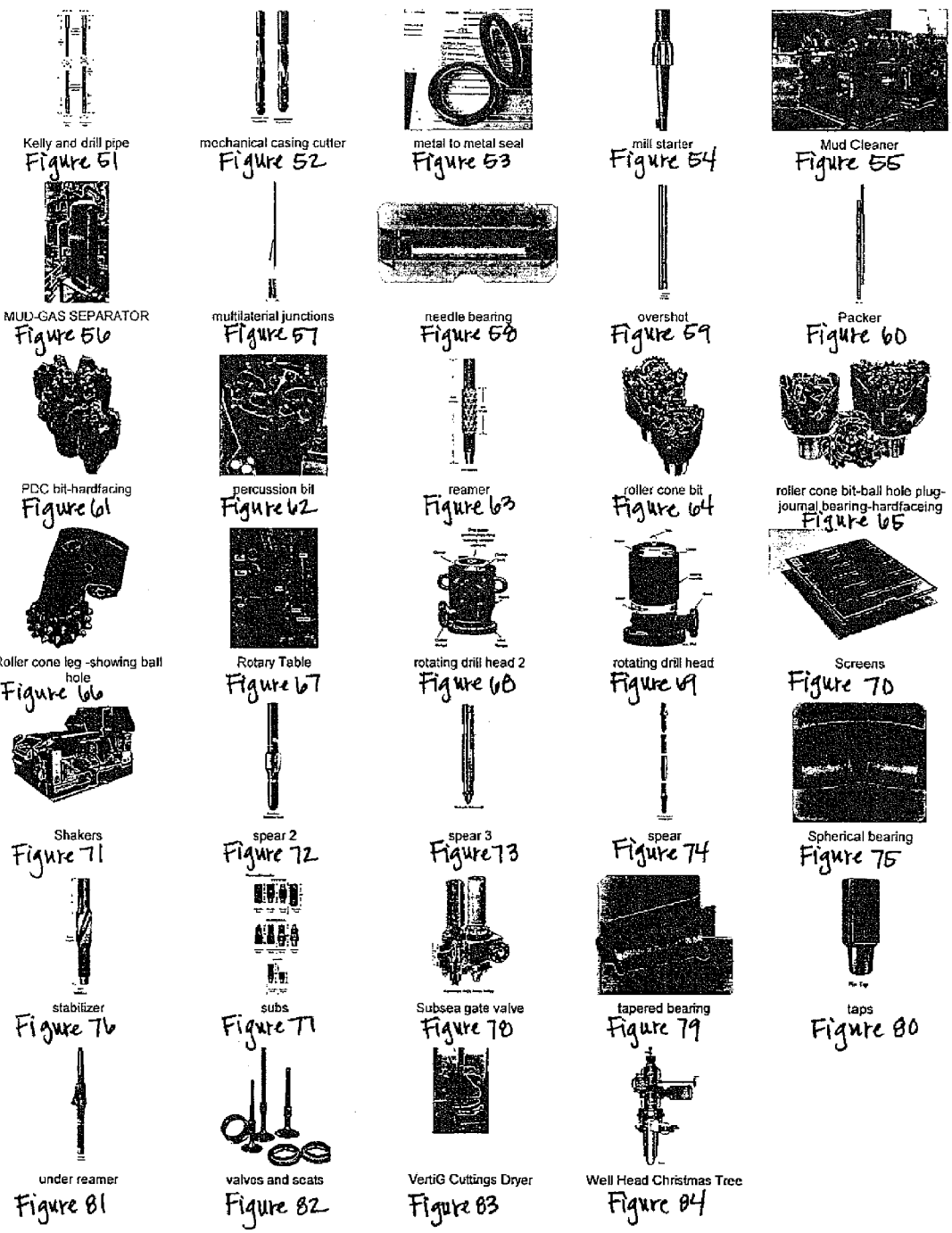

BALL HOLE WELDING USING THE FRICTION STIR WELDING (FSW) PROCESS

CROSS-REFERENCE TO RELATED APPLICATIONS

This application is a continuation application of U.S. patent application Ser. No. 12/629,201 filed on Dec. 2, 2009, which claims the benefit pursuant to 35 U.S.C. §120 as a continuation-in-part application of U.S. patent application Ser. No. 11/136,609, filed on May 23, 2005, which claims priority to all of the subject matter included in provisional applications with Ser. No. 60/573,707, filed May 21, 2004, Ser. No. 60/637,223, filed Dec. 17, 2004 and Ser. No. 60/652,808, filed Feb. 14, 2005, and non-provisional applications with Ser. No. 11/090,909, filed Mar. 24, 2005 and Ser. No. 11/090,317, filed Mar. 24, 2005. The above referenced applications are hereby incorporated by reference in their entirety.

BACKGROUND

1. Field

Embodiments disclosed herein relate generally to solid state processing of materials through friction stirring, which includes friction stir processing, friction stir mixing, and friction stir welding. This invention also relates to the application of the friction stir processes to the manufacturing of roller cone drill bits used in wellbore operations, oil field and mining equipment and tools, and components or parts used in other industrial and medical applications. In particular, embodiments disclosed herein relate generally to ball hole plugs and methods of welding ball hole plugs to roller cone drill bits using friction stir welding.

2. Background Art

Friction stir welding (hereinafter "FSW") is a technology that has been developed for welding metals and metal alloys. The FSW process often involves engaging the material of two adjoining workpieces on either side of a joint by a rotating stir pin or spindle. Force is exerted to urge the spindle and the workpieces together and frictional heating caused by interaction between the spindle and the workpieces results in plasticization of the material on either side of the joint. The spindle is traversed along the joint, plasticizing material as it advances, and the plasticized material left in the wake of the advancing spindle cools to form a weld.

FIG. 1 is a perspective view of a tool being used for friction stir welding that is characterized by a generally cylindrical tool 10 having a shoulder 12 and a pin 14 extending outward from the shoulder. The pin 14 is rotated against a workpiece 16 until sufficient heat is generated, at which point the pin of the tool is plunged into the plasticized workpiece material. The workpiece 16 is often two sheets or plates of material that are butted together at a joint line 18 but could also be cylindrical or other non-flat materials or surfaces. The pin 14 is plunged into the workpiece 16 at the joint line 18.

The frictional heat caused by rotational motion of the pin 14 against the workpiece material 16 causes the workpiece material to soften, preferably without reaching a melting point of the workpiece material. The tool 10 is moved transversely along the joint line 18, thereby creating a weld as the plasticized material flows around the pin from a leading edge to a trailing edge. The result is a solid phase bond 20 at the joint line 18 that may be generally indistinguishable from the workpiece material 16 itself, in comparison to other welds. However, it has been discovered that the solid phase bond 20 may be created to also have different and advantageous properties as compared to the original workpiece material 16.

It is observed that when the shoulder 12 contacts the surface of the workpieces, its rotation creates additional frictional heat that plasticizes a larger cylindrical column of material around the inserted pin 14. The shoulder 12 provides a forging force that contains and/or forces downward the generally upward metal flow caused by the tool pin 14.

During FSW, the area to be welded and the tool are moved relative to each other such that the tool traverses a desired length of the weld joint. The rotating FSW tool provides a continual hot working action, plasticizing metal within a narrow zone as it moves transversely along the base metal, while transporting metal from the leading face of the pin to its trailing edge. As the weld zone cools, there is typically no solidification as no liquid is created as the tool passes. It is often the case, but not always, that the resulting weld is a defect-free, recrystallized, fine grain microstructure formed in the area of the weld.

Travel speeds of the pin 14 along the joint line 18 are typically around 10 to 500 mm/min with rotation rates of 200 to 2000 rpm. However, operating parameters outside of this range may also be used. Temperatures reached in FSW are usually close to, but below, solidus temperatures of the base materials. Friction stir welding parameters are a function of a material's thermal properties, high temperature flow stress and penetration depth.

Friction stir welding has several advantages over fusion welding because 1) filler metal is not required, 2) the process can be fully automated requiring a relatively low operator skill level, 3) the energy input is efficient as all heating occurs at the tool/workpiece interface, 4) minimum post-weld inspection is required due to the solid state nature and extreme repeatability of FSW, 5) FSW is tolerant to interface gaps and as such little pre-weld preparation is required, 6) there is no weld spatter to remove, 7) the post-weld surface finish can be exceptionally smooth with little to no flash, 8) there is little or no porosity and oxygen contamination, 9) there is little or no distortion or surrounding material, 10) minimal operator protection is required as there are no harmful emissions, and 11) weld properties are improved.

Previous patent documents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel, and non-ferrous materials. Another class of materials that were also able to take advantage of friction stir welding is the superalloys. Superalloys can be materials having a higher melting temperature than bronze or aluminum, and may have other elements mixed in as well. Some examples of superalloys are nickel, iron-nickel, and cobalt-based alloys generally suitable for use at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other nonferrous materials.

Those skilled in the art have previously taught that a tool is needed that is formed using a material that has a higher melting temperature than the material being friction stir welded. In some embodiments, a superabrasive was used in the tool.

The embodiments of the present invention are generally concerned with these functionally unweldable materials, as well as the superalloys, and are hereinafter referred to as "high melting temperature" materials throughout this document. It is noted that the principles of the present invention are also equally applicable to materials that are considered lower melting temperature or functionally weldable materials.

In line with friction stir welding, the inventors have determined that new and advantageous properties can also be obtained by performing friction stir processing and friction stir mixing (see for example the application having Ser. No. 11/090,910 and filed Mar. 24, 2005). Friction stir processing is a solid state process created by friction that uses a tool not to join materials together in welding, but to instead condition or treat the surface or all of a material by running the tool through at least a portion of the material being processed.

Friction stir mixing is similar to friction stir processing as described above, but combines with it the aspect of mixing in one or more different materials into a base material or workpiece to create a new material having advantageous characteristics as compared to the original base material.

Liquid State Processing of Materials

The periodic table outlines and organizes the elements that are used to engineer all of the materials developed and produced today. Each of these elements can exist in solid, liquid, or gaseous states depending on temperature and pressure. Solid materials created from these elements such as metallic ferrous alloys, metallic nonferrous alloys, metal matrix composites, intermetallics, cermets, cemented carbides, polymers, and others undergo specific processing to create the material's desired physical and mechanical properties.

Each of the previously named solid material types was created by mixing the elements together in some fashion and applying heat and/or pressure so that a liquid and/or liquid-solid mixture is formed. The mixture is then cooled to form the resulting solid material. The solid material formed will have a characteristic microscopic crystalline or granular structure that reveals some of the processing characteristics, phases of element mixtures, grain orientation, etc. For example, mild steel is made by mixing specified amounts of carbon and iron together (along with trace elements) and heating the mixture until a liquid is formed. As the liquid cools and solidifies, steel is formed.

Cooling rates, subsequent heat treatments and mechanical processing will affect the microstructure of the steel and its resulting properties. The microstructure reveals a granular structure having an average specific grain size and shape. Many decades of research and engineering have been dedicated to understanding and creating different materials from a variety of elements using temperature and mechanical processing to create desired material and mechanical properties.

Engineered materials such as metallic ferrous alloys, metallic nonferrous alloys, metal matrix composites, intermetallics, cermets, cemented carbides and others all require a process that melts some or all of the elements together to form a solid. However, there are several problems that occur as a result of having this liquid to solid phase transformation.

For example, during the liquid phase, the time at temperature and/or pressure often becomes a critical variable. Some elements dissolve into submixtures while others precipitate out as they are combined with other elements to form new phases. This dynamic behavior is a complex interaction of elemental solubility, diffusion characteristics, and thermodynamic behavior. Because of these complexities, it is difficult to engineer a material from the beginning. The material is instead developed through trial and error experimentation. Even when a specific elemental composition is determined, the liquid phase processing can have a multitude of process parameters that will alter the resulting solid material's properties. During this liquid phase, time, temperature and pressure play a critical role in determining the material's characteristics. The more elements combined in the mixture, the more difficult liquid phase processing becomes to produce a predictable material.

As the mixture solidifies, undesirable phases precipitate into the solid structure, detrimental dendritic structures can form, grain size gradients are created from temperature gradients, and residual stresses are induced which in turn cause distortions or undesirable characteristics in the resulting material. Solidification defects such as cracking and porosity are constant problems that plague the processing of materials formed from a prior liquid phase. All of these problems combine to lower a given material's mechanical and material properties. Unpredictability in a material's properties results in unpredictability in a component's reliability that is made from such materials.

Because of these solidification problems and resulting defects, additional mechanical and thermal processes are often performed in order to bring back some of the material's desirable properties. These processes include forging, hot rolling, cold rolling, and extrusion to name a few. Unfortunately, mechanical processes often give the material undesired directional properties, reduce ductility, add incremental residual stresses and increase cost. Heat treatments can be used to relieve residual stresses, but even these treatments can cause grains to grow and other distortions to occur.

It is often the case that the bulk size of materials being processed prohibits shorter processing times needed to prevent grain growth. The thermal capacitance of these large bulk materials also maintains elevated temperatures for extended periods of time which by itself also creates an environment for detrimental prolific grain growth. Unfortunately, quickly dropping the temperature of the bulk material through quenching is again problematic because cracking and residual stresses that approach the tensile strength of the material can be formed.

Thus it should be apparent why it is so difficult to design and produce a material with a given grain size, grain size distribution and elemental composition that has a desired range of properties when it is necessary to use a liquid phase mixture to create the solid material.

For example, manufacturers of many materials desire to produce very fine grain (sub-micron) microstructures to obtain the highest possible material and mechanical properties possible. Presently, fine grain microstructures are achieved with the addition of grain growth inhibiting elements or mixtures to the liquid phase of the processing. While reducing grain size, these inhibitors often cause other material processing problems. Some of these problems include lower strength of the material, grain boundary defects, and detrimental phases.

High Temperature Friction Stir Welding Tool

In conjunction with the problems associated with the creation of materials that require liquid to solid phase transformation, recent advancements in friction stir welding technologies has resulted in tools that can be used to join high melting temperature materials such as steel and stainless steel together during the solid state joining processes of friction stir welding.

This technology involves using special friction stir welding tools capable of withstand higher operating temperatures. FIG. 2 shows one example of a friction stir welding tool that can be used in high temperature applications. In this example, the tool comprises a polycrystalline cubic boron nitride (PCBN) tip 30, a locking collar 32, a thermocouple set screw 34 to prevent movement, and a shank 36.

When this tool is used it is effective at friction stir welding of various materials. This tool design is also effective when using a variety of tool tip materials besides PCBN. Other materials that may be used include and PCD (polycrystalline diamond) and refractories such as tungsten, rhenium, iridium, titanium, molybdenum, etc.

Because these tip materials are often expensive to produce, a design having a replaceable tip is an economical way of producing and providing tools to the market because they can be replaced when worn or fractured.

Applications Requiring Durable Higher Melting Temperature Materials

Many applications require the use of durable and/or higher melting temperature materials. These applications include, but are not limited to: oil and gas exploration, development, recovery, transportation, storage and processing; mining; construction; petrochemical; defense; and other industrial applications. For example, in oil and gas exploration and production, products and engineering services that include the use of durably higher melting temperature materials include drilling and completion fluid systems, solids-control equipment, waste-management services, production chemicals, three-cone and fixed cutter drill bits, turbines, drilling tools, under reamers, casing exit and multilateral systems, packers and liner hangers, to name a few.

Products and services in the industries described above typically require equipment and tools that must operate in harsh or demanding environments. While the wearing down or failure of parts and components is an expected reality, tremendous benefits may be obtained if the life of parts and components can be extended and/or their performance or reliability improved. For example, in oil and gas exploration consider a roller cone drill bit connected to the distal end of a drill string to drill a well bore that may span a mile or more in length underground. When a bit component, such as the seals or bearings fail, the entire drill string must be extracted to retrieve and replace the bit. This can result in a significant cost to a drilling operation because of the ancillary equipment, manpower, and time required retrieving and replacing the bit. Thus, a significant benefit can be obtained by providing or using a bit having longer lasting components.

In general, methods and techniques that can be used to produce parts, components, tools, and/or equipment having an increased life-cycle and/or improved performance and/or reliability are greatly desired in these and other applications.

Historically, there have been two main types of drill bits used drilling earth formations, drag bits and roller cone bits. The term "drag bits" refers to those rotary drill bits with no moving elements. Drag bits include those having cutters attached to the bit body, which predominantly cut the formation by a shearing action. Roller cone bits include one or more roller cones rotatably mounted to the bit body. These roller cones have a plurality of cutting elements attached thereto that crush, gouge, and scrape rock at the bottom of a hole being drilled.

Roller cone drill bits typically include a main body with a threaded pin formed on the upper end of the main body for connecting to a drill string, and one or more legs extending from the lower end of the main body. Referring to FIG. 88, a conventional roller cone drill bit, generally designated as 110, consists of bit body 111 forming an upper pin end 112 and a cutter end of roller cones 113 that are supported by legs 114 extending from body 111. Each leg 114 includes a journal 115 extending downwardly and radially inward towards a center line of the bit body 111, with cones 113 mounted thereon. Each of the legs 114 terminate in a shirttail portion 116. The threaded pin end 112 is adapted for assembly onto a drill string (not shown) for drilling oil wells or the like.

Conventional roller cone bits are typically constructed from at least three segments. The segments are often forged pieces having an upper body portion and a lower leg portion. The lower leg portion is machined to form the shirttail section and the journal section. Additionally, lubricant reservoir holes, jet nozzle holes, and ball races are machined into the forgings. Roller cones are rotatably mounted to a bearing system on the formed journals, and the leg segments are positioned together longitudinally with journals and cones directed radially inward to each other. The segments may then be welded together using conventional techniques to form the bit body. Upon being welded together, the internal geometry of each leg section forms a center fluid plenum. The center fluid plenum directs drilling fluid from the drill string, out nozzles to cool and clean the bit and wellbore, etc.

Roller cone bits may use a roller bearing system, a journal bearing system, or a combination of the two to allow rotation of the roller cones about the journal. Each type of bearing system is ordinarily comprised of a number of separate components, including primary bearings, secondary bearings, a seal system, features that resist thrust loading, and a lubrication system. Also typical to both bearing systems are cone retention balls, which are used to prevent roller cones from separating from their journals.

Generally, roller bearing systems use rollers to separate the roller cones from the journal. A cone retention ball bearing is usually provided to carry axial load, and the rollers typically carry radial loads. Journal bearing systems, on the other hand, use a film of lubricant to separate the roller cones from the journal. The inner surfaces of roller cones are specially designed so the film of the lubricant prevents contact between the roller cone and journal. Roller bearings are common in roller cone drill bits, especially in roller cone drill bits with diameters larger than twelve inches, because they can reliably support large loads and generally perform well in the drilling environment. Bits having small diameters commonly use journal bearing systems because there is less space to install suitably sized rollers in a small cone.

Referring to FIG. 89, a typical ball bearing system is shown within a roller cone drill bit leg. Roller bearings 201 are placed around the journal 202 prior to sliding the journal 202 into the roller cone body 203. Alternate bearing systems may be used to separate the roller cone body 203 from the journal 202, such as floating bearings or a journal bearing system. The journal 202 has a journal race surface 204, and the roller cone body 203 has a roller cone race surface 205, which meets to form a ball race 206. A ball hole 207 extends from the back face 208 of the drill bit leg 209 to the journal race surface 204. A plurality of cone retention balls 210 are then inserted through the ball hole 207 into the ball race 206, to hold the roller cone 203 on the journal 202. Once the balls 210 are in place, a ball hole plug 211 is inserted into the ball hole 207 and welded into place, to prevent the roller cone 203 from slipping off the journal 202.

To prevent damage to the cone retention balls 210 and edges of the ball hole 207, cutter designs known in the art have the ball hole 207 placed at 180 degrees from the load bearing zone of the journal 202. This placement is selected to prevent forcing the balls 210 against the rough edges of the ball hole 207 as they pass over the hole 207. If the ball hole 207 were positioned in the load bearing zone, the balls 210 would forcibly impact the edges of the ball hole 207, probably resulting in metal chips and debris being removed from the journal 202 so as to contaminate the lubricant and eventually destroy the bearings and seals.

Contained within the bit body is a grease reservoir system (not shown). A lubricant passage 212 is provided from the reservoir to race surfaces 204, 205 formed between the journal 202 and roller cone body 203, to lubricate race surfaces 204, 205 by a lubricant or grease composition. Lubricant or grease also fills the portion of the ball hole 207. Lubricant or grease is retained in the bearing structure by a resilient seal 213 between the roller cone 203 and journal 207.

For many applications, roller cone drill bits are limited by the bearing capacity or bearing life of the bit. A contributing cause of bearing failure in roller cone systems is failure of the weld joint between the ball hole plug and the back face of the leg. In addition to providing a secure weld, protection of the weld joint from wear, erosion and corrosion is necessary to prevent failure of the plug and/or leg in the plug region, and ultimately, failure of the bit.

Current methods of welding the ball hole plug to the back surface of the bit leg are difficult to implement and may cause flaws in the weld joint. For example, GMAW welding can cause porosity, inclusions, cracks and an area of un-fused material at the weld root, any of which can lead to premature failure by initiating fatigue stresses. Further, in gas or plasma arc welding, heat of the arc weld and molten weld deposit can potentially affect the seal integrity of the weld joint. Additionally, dissimilar chemistry in a deposit weld metal and the leg steel may cause galvanic corrosion in caustic or acidic drilling conditions.

Another cause of bearing failure in roller cone drill bit systems is spalling, which may occur, for example, when the ball hole plug is not exactly in line with the journal race surface and continuously passing retention balls flake off material from the plug. When the surface spalls, debris contaminates the lubricant which causes rapid wear and damage to the rest of the operable bearing and seal components which eventually results in bearing failure. Accordingly, there exists a continuing need for developments in securing a ball hole plug to a bit leg that may at least provide for increased bearing life.

SUMMARY OF INVENTION

It is one aspect of the present invention to provide a system and method for friction stirring of a material in order to obtain beneficial microstructures.

It is another aspect to provide a system and method for friction stirring in order to obtain beneficial macro structures.

It is another aspect to provide a system and method for friction stirring to improve toughness of a workpiece.

It is another aspect to provide a system and method for friction stirring to increase or decrease hardness of a workpiece.

It is another aspect to provide a system and method for friction stirring to modify targeted areas of a workpiece.

It is another aspect to provide a system and method for friction stirring to modify a workpiece such that different areas of the same workpiece are modified to have different properties.

It is another aspect to provide a system and method for friction stirring to modify the surface of a workpiece.

It is another aspect to provide a system and method for friction stirring to modify the surface and at least a portion of the interior of the workpiece.

It is another aspect to provide a system and method for friction stirring that only modifies portions of a workpiece while leaving other portions that are not modified.

In various embodiments of the present invention, solid state processing is performed on a workpiece that operates alone or is a component of equipment used in various demanding, harsh and wearing environments in which failure of a product could compromise safety or the environment or otherwise result in significant cost for repair or replacement, wherein the solid state processing performed by using a tool capable of friction stir processing, friction stir mixing, or friction stir welding results in a workpiece that offers a longer life-cycle and/or improved performance and/or improved reliability as a result of the solid state processing, wherein solid state processing modifies characteristics of a workpiece, and wherein modified characteristics of the material include, but are not limited to, microstructure, macrostructure, toughness, hardness, grain boundaries, grain size, impact resistance, ballistic properties, the distribution of phases, ductility, superplasticity, change in nucleation site densities, compressibility, expandability, coefficient of friction, abrasion resistance, corrosion resistance, fatigue resistance, magnetic properties, strength, radiation absorption, and thermal conductivity.

In one aspect, embodiments disclosed herein relate to a roller cone drill bit including a bit body, at least one leg extending downward from the bit body. Each leg includes a leg back face and a journal and each journal has a journal race surface, a roller cone mounted on each journal, wherein each roller cone includes a roller cone race surface, a ball race configured between the journal race surface and the roller cone race surface, a plurality of retention balls disposed within the ball race, a ball hole extending from the leg back face to the journal race surface, and a ball hole plug. The ball hole plug is secured to the leg by a friction stir weld.

In another aspect, embodiments disclosed herein relate to a roller cone drill bit including a bit body and at least one leg extending downward from the bit body. Each leg includes a leg back face and a journal and each journal has a journal race surface. A roller cone is mounted on each journal, wherein each roller cone has a roller cone race surface. A ball race is configured between the journal race surface and the roller cone race surface, and a plurality of retention balls is disposed within the ball race. A ball hole extends from the leg back face to the journal race surface, wherein the ball hole is non-cylindrical near the leg back face. A ball hole plug is secured to the leg by a friction stir weld. The ball hole plug includes a plug head, wherein the plug head is non-cylindrical, a plug body, and a ball retainer end.

In another aspect, embodiments disclosed herein relate to a method for retaining a roller cone on a bit leg, including mounting a roller cone on a journal extending downward from the bit leg, inserting a plurality of retention balls into a ball hole extending through a leg back face to the journal, inserting a ball hole plug into the ball hole, and friction stir welding the ball hole plug to a back face of the bit leg.

In yet another aspect, embodiments disclosed herein relate to a method for retaining a roller cone on a bit leg, including inserting a plurality of retention balls into a ball hole, inserting a ball hole plug into the ball hole, friction stir welding the ball hole plug to a back face of the bit leg using a friction stirring tool, and removing the friction stirring tool.

Other aspects and advantages of the invention will be apparent from the following description and the appended claims.

BRIEF DESCRIPTION OF DRAWINGS

FIG. 15 is a table of how material characteristics can be affected through friction stirring.

FIGS. 16 through 84 are illustrations of equipment, or components for equipment that will benefit from friction stirring of particular areas of the equipment or components.

DETAILED DESCRIPTION

Figure 1:
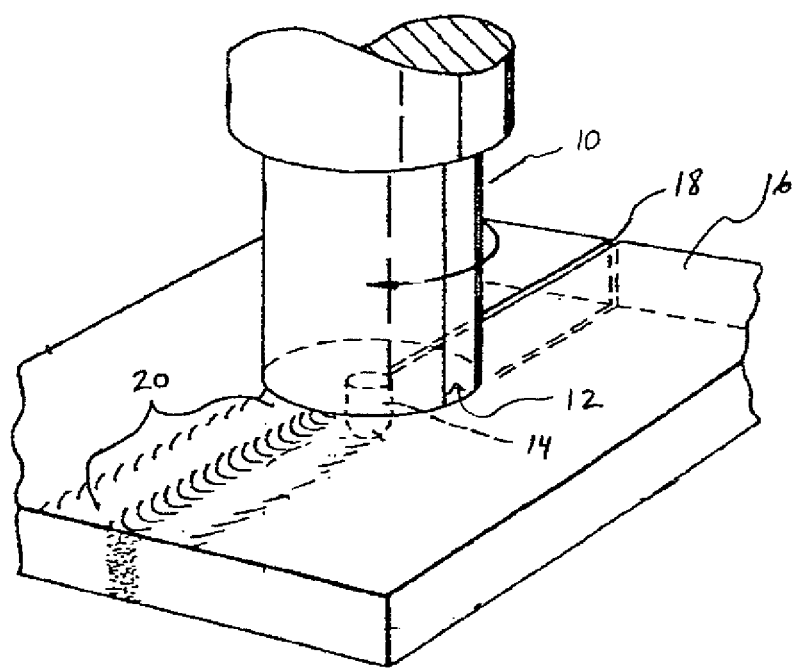
FIG. 1 is a perspective view of a tool as taught in the prior art for friction stir welding, wherein the tool can be used to perform a new function.

Reference will now be made to the drawings in which the various aspects, elements, and embodiments of the present invention will be discussed so as to enable one skilled in the art to make and use the embodiments. It is to be understood that the following description is only exemplary of the principles of the present invention, and should not be viewed as narrowing the claims which follow.

In one aspect, the present invention as explained hereinafter will apply to several different classes of materials. In one or more embodiment, the materials may be considered to be those materials that have melting temperatures higher than bronze and aluminum as previously disclosed, and are referred to as "higher melting temperature materials". This class of materials includes, but is not limited to, metal matrix composites, ferrous alloys such as steel and stainless steel, non-ferrous materials, superalloys, titanium, cobalt alloys typically used for hard-facing, and air hardened or high speed steels. In other embodiments, the materials may be considered to be all other lower melting temperature materials that are not included within the definition of the higher melting temperature materials described above.

Solid State Processing

In accordance with aspects of the present invention, a solid state processing and a solid state joining method may be used in the manufacture of drill bits, oil field tools, or tools or equipment for industrial application or components thereof to yield improved material and mechanical properties for these applications. It is noted that friction stir processing and joining may be exclusive events of each other, or they may take place simultaneously. It is also noted that solid state processing in accordance with aspects of the present invention may also be referred to interchangeably with the phrase "friction stirring". Solid state processing is defined herein as a temporary transformation into a plasticized state that typically does not include a liquid phase. However, it is noted that in some embodiments, one or more elements may be allowed to pass into a liquid phase, and still obtain benefits noted for embodiments of the present invention.

The benefits of solid state joining became apparent with the development of friction stir welding when two or more materials were joined together. In addition, it was observed that friction stir processing and friction stir mixing can be used to materially alter the properties of materials.

In accordance with one aspect of the present invention, friction stirring technology is applied to components or parts of drill bits, oil field tools, or other equipment and tools which may operate in high wear, high stress, high pressure, corrosive, radioactive, and/or otherwise harsh environments. In some embodiments, the components may be difficult to reach time-consuming to extract and/or replace when worn or damaged, or may be used in environments where failure is not considered an acceptable option, such as a blow out preventor.

The use of friction stirring for components in these applications makes it possible to engineer materials for these harsh or demanding environments that have modified microstructures that improve the life-cycle, performance or reliability of the materials or components used. Aspects of the present invention described herein may be applied to both lower melting temperature and higher melting temperature materials and alloys.

Tools that may be used in accordance with one or more embodiments of the present invention for performing desired friction stirring, have been described in previous documents, including documents incorporated herein by reference. In a brief explanation, friction stirring may be performed using the tool shown in FIG. 1. The friction stirring tool shown in FIG. 1 includes a shank, a shoulder, and a pin. In one or more embodiments, the tool pin is rotated and plunged into the material to be processed and moved transversely across an area of the component being processed, thereby causing the material to undergo plasticization in a solid state process. This results in the material being modified to have properties that are different from the original material.

Figure 2:
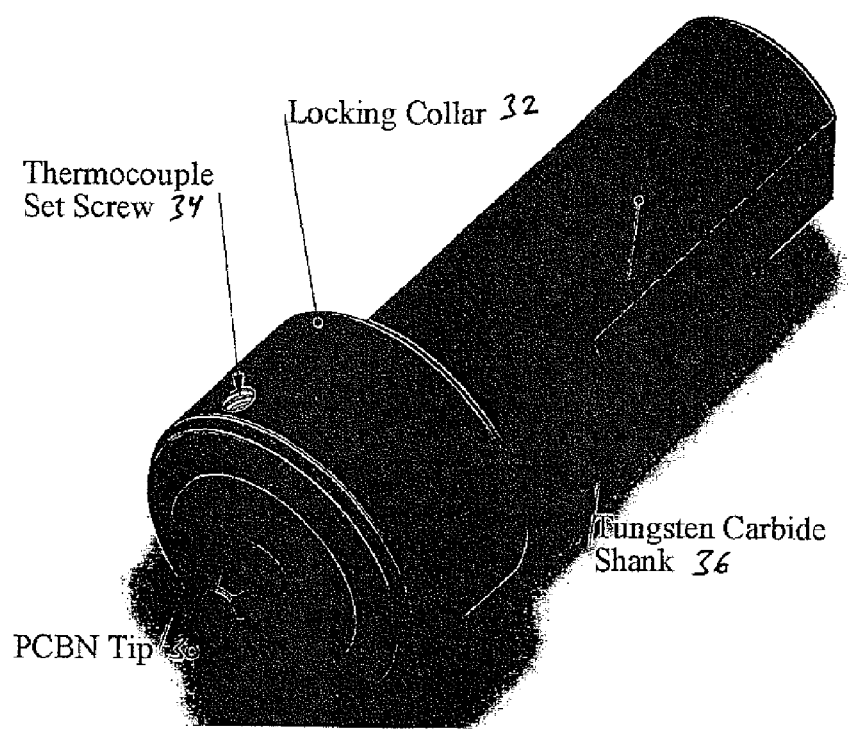
FIG. 2 is a perspective view of a removable polycrystalline cubic boron nitride (PCBN) tip, a locking collar and a shank.

In another embodiment, a tool as shown in FIG. 2 may be used in the assembly of components or tools as an alternative to traditional prior art joining techniques to provide enhanced material or mechanical properties around the joint interface or to enhance the performance or reliability of the component or tool compared to that obtained using prior art joining techniques.

Figure 3:
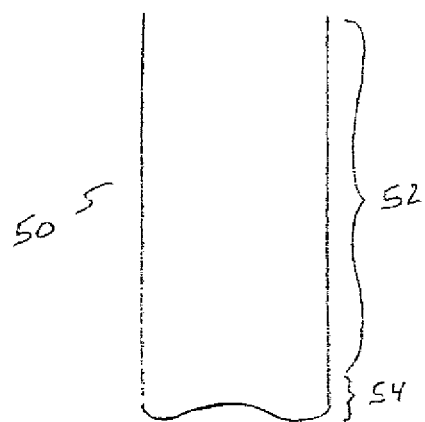
FIG. 3 is one embodiment of a friction stir processing tool having a shoulder and shank of equal diameter.

In other embodiments, a tool as shown in FIG. 3 can be used to perform friction stirring. FIG. 3 is a cross-sectional view of a cylindrical friction stirring tool 50. The friction stirring tool 50 has a shank 52 and a shoulder 54, but no pin. Therefore, instead of plunging a pin into the material to be solid state processed, the shoulder is pressed against the material. Penetration of the shoulder is typically limited to the surface region of the material or just below it because of the larger surface area of the shoulder as compared to the pin.

It should be noted that while the pin 14 of the tool 10 in FIG. 1 does not have to be plunged into the material, the pin may be designed for easy penetration. Thus, because the pin 14 is more likely to have a very small surface area as compared to the tool 50 of FIG. 3, the pin is more likely to plunge into the material. However, in some cases it may be advantageous to use the smaller surface area of the pin 14 for processing smaller areas of a material, which may be limited to the surface thereof. In one or more embodiments of the present invention, surface and near-surface processing may be used to achieve desired material properties for materials or components used in harsh or demanding environments.

Experimental results have shown that in selected embodiments, material being processed may undergo several changes during friction stirring. These changes can include, but should not be considered limited to, the following: toughness, hardness, grain boundaries, grain size, distribution of phases, ductility, superplasticity, change in nucleation site densities, compressibility, expandability, friction, and thermal conductivity.

Regarding nucleation, in one or more embodiments, observations indicate that there may be more nucleation sites due to the energy induced into the material from the heat and deformation generated during friction stir processing. Accordingly, more of the solute material may be able to come out of solution or precipitate to form higher densities of precipitates or second phases.

As an example, the following figures illustrate cross-sections of material that has undergone friction stirring through the plunging of a tool into the material. While observing the figures, it should be understood that similar or identical results can be obtained on smaller scales if the tool is not plunged into the material being processed.

Figure 4:
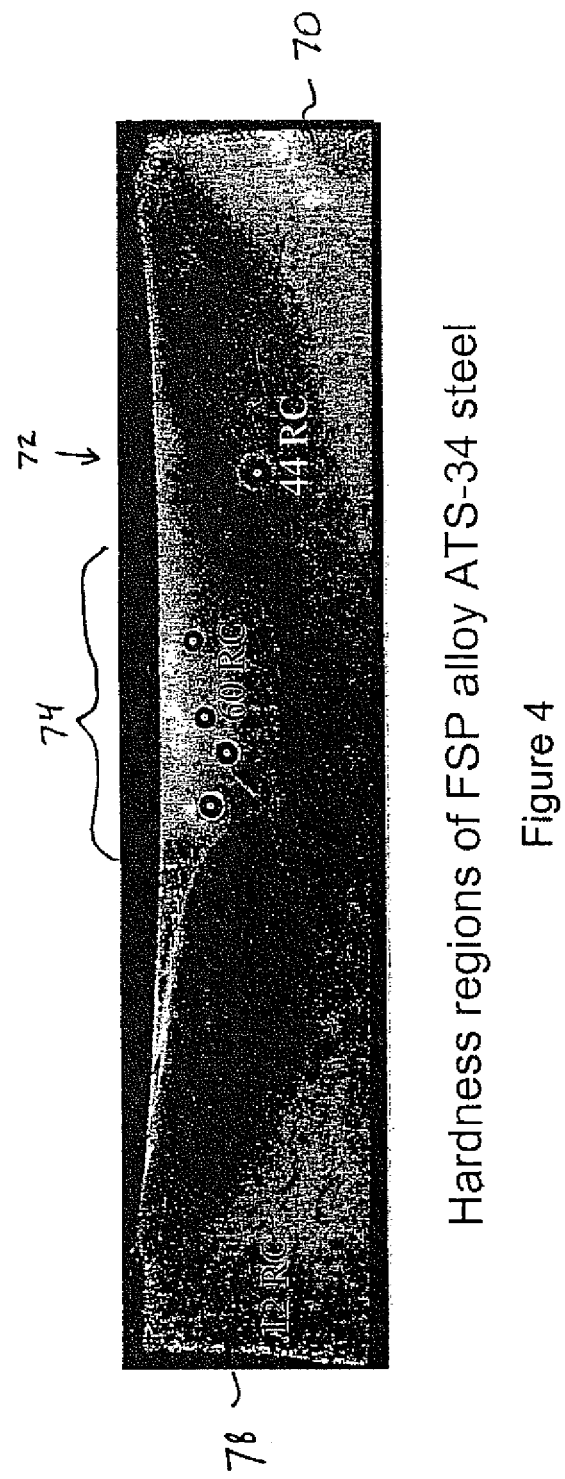
FIG. 4 is a cross-sectional view of a base material that is friction stir processed to modify the characteristics of the base material.

In FIG. 4, a section of ATS 34 steel was friction stir processed by plunging a tool similar to the tool shown in FIG. 2 into the base material 70 and moving the tool transversely along a middle length thereof. Transverse movement would be perpendicular to the page, thus FIG. 4 is a cross-sectional view of the base material 70.

FIG. 4 shows that the tool plunged into the base material 70 from the top 72. Several areas appearing as small circles are shown as having been tested for hardness relative to the Rockwell scale in the various zones of the base material. The stir zone 74 is shown having a hardness of 60 RC. Close to the boundary of the inner TMAZ (thermally mechanically affected zone) and the outer HAZ (heat affected zone) the base material 70 is shown as having a hardness value of 44 RC at a location 76. Finally, an unprocessed or original base material zone is shown as having retained, in other samples, its original hardness value of 12 RC at approximately location 78.

Figure 5:
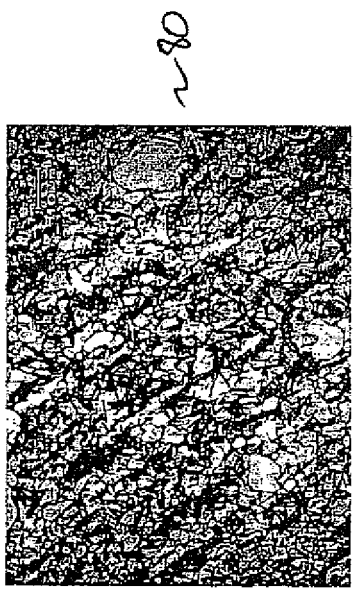
FIG. 5 is a view of the microstructure of the base material before friction stir processing.

FIG. 5 is provided to illustrate the microstructure of a processed base material 80. The figure shows that friction stir processing has created Martensite indicating the harder phase of the processed base material 80.

Figure 6:
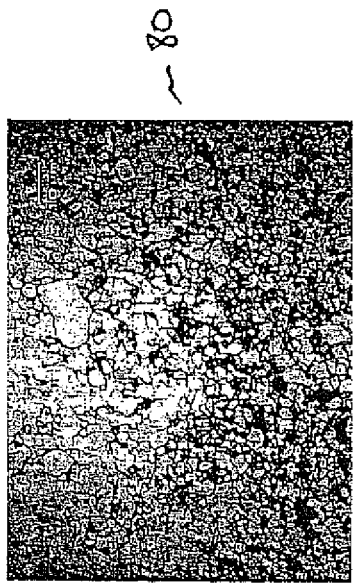
FIG. 6 is a view of the microstructure of the base material after friction stir processing.

Similarly, FIG. 6 is also an illustration of the microstructure of the material 80 after it has been friction stir processed. The figure shows the reduced grain size in the processed base material 80.

For purposes of comparison, heat treatment of the base material 70 of FIG. 5 would typically result in a hardness value less than 60 RC. In some embodiments of the present invention, it is possible to selectively friction stir process large portions of the base material 70 that are otherwise difficult to do with other heat treatment methods. In addition, a material designer can be more selective in the areas of the material that are to receive processing. Furthermore, although heat treatment will alter the microstructure of the material, the changes will not be the same type of changes that can be achieved with friction stir processing. For example, the processed area has also experienced a substantial increase in toughness. This is notable because there is typically a tradeoff between toughness and hardness when processing materials using conventional treatment techniques.

Figure 7A:
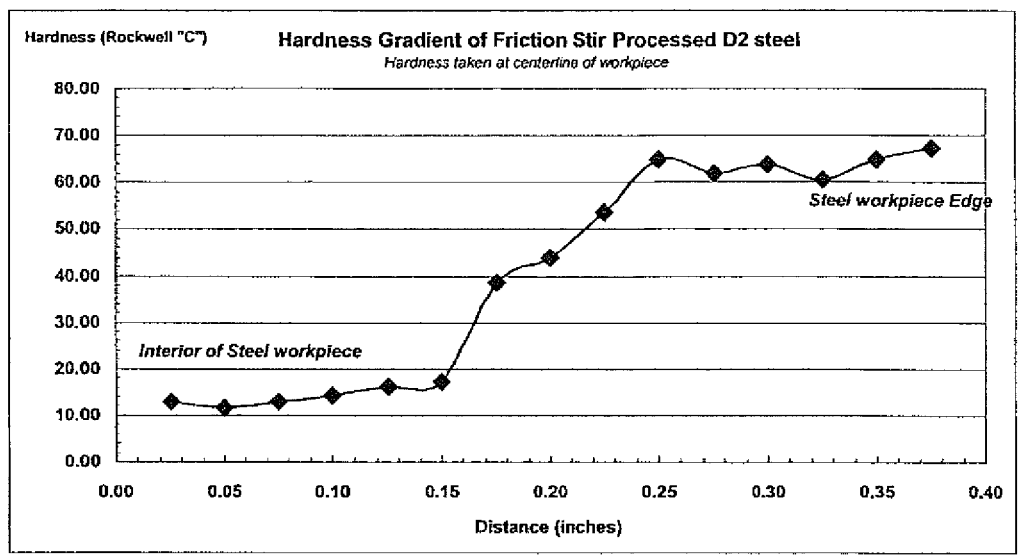
FIG. 7A is a graph of a hardness gradient of the friction stir processed material.

In another embodiment, a member formed of D2 steel was friction stir processed along one edge thereof. After processing the edge, the hardness across the width of the member from an interior unprocessed region to the processed region was determined. The hardness gradient in the material that is a result of the friction stir processing is illustrated in the graph of FIG. 7A. In this example, the friction stir processing resulted in a significant improvement in the hardness characteristics of the material in the friction stir zone along with an improvement in toughness.

Figure 7B:
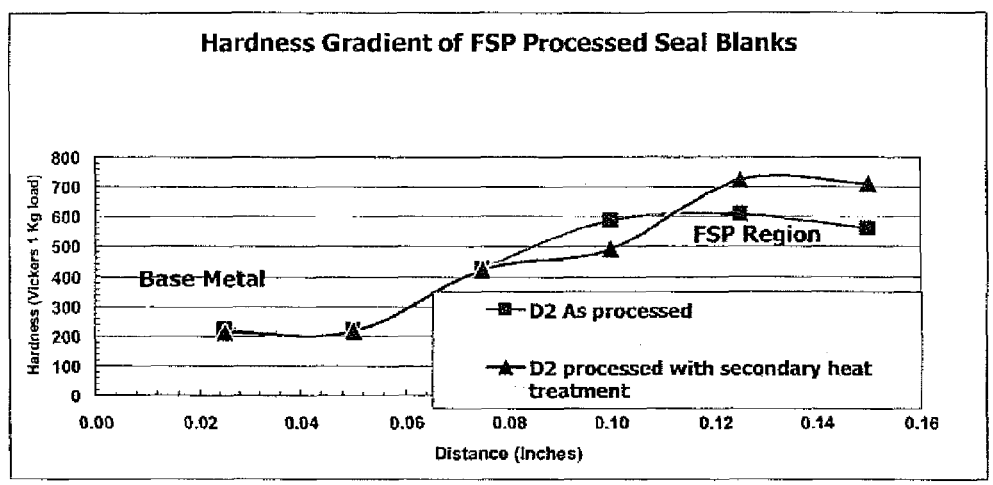
FIG. 7B is a graph of a hardness gradient where heat treatment has been performed in addition to friction stir processing.

Further experimentation resulted in a D2 sample workpiece that had the hardness gradient characteristics as described in FIG. 7B. However, further secondary heat treatments were performed to obtain an additional increase in hardness of the materials.

Friction stirring techniques in accordance with aspects of the present invention can be used to not only create durable materials, but materials that can be altered to perform better in very specific environments.

Figure 8:
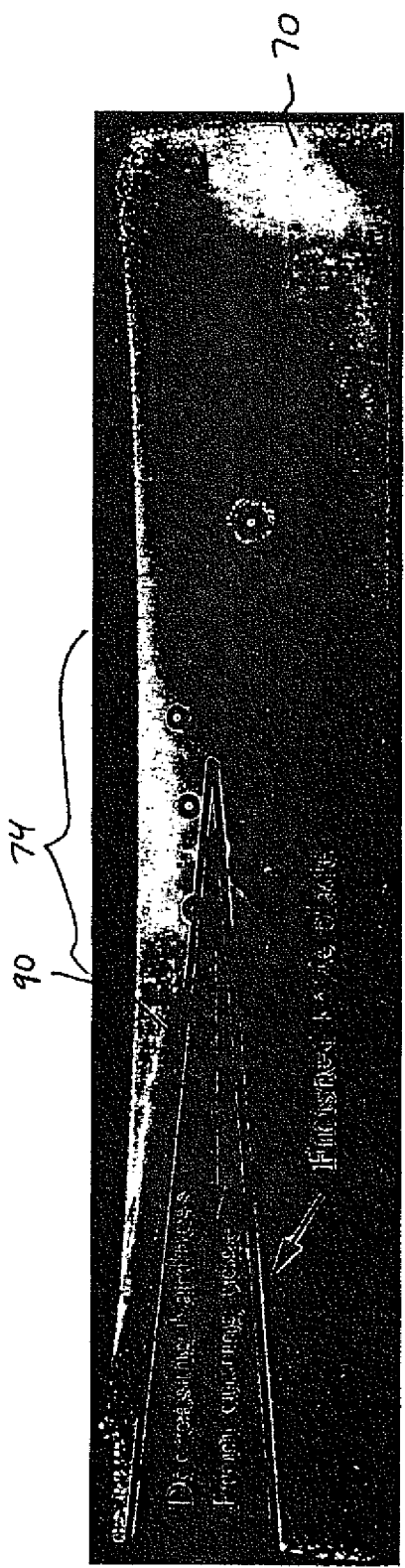
FIG. 8 is a cross-sectional view of a base material that is friction stir processed to modify the characteristics of the base material, and having an overlay identifying where a cutting edge could be formed from the friction stir processed material.

For example, FIG. 8 is an illustration of an overlay 90 of a cutting edge on the ATS-34 steel base material 70. The overlay 90 indicates one advantageous configuration of a cutting edge that could be machined from the material 70, wherein the configuration takes the greatest advantage of the improved toughness and hardness characteristics of the friction stir processed material 70. Note that the cutting edge overlay 90 is formed in the processed region 74 that will result in a hard and yet tough cutting edge. Likewise, any object being formed from a processed material can be arranged to provide the most advantageous properties where it is most critical for the object. In this example, a beneficial cutting edge will be achieved from having an edge disposed well within the processed material.

Figure 9:
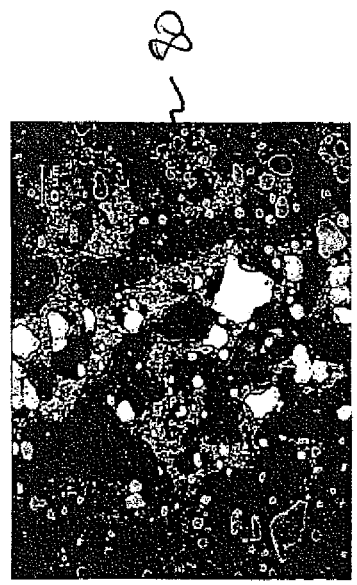
FIG. 9 is an illustration of the microstructure that shows large grain size of the annealed condition of the material.

FIG. 9 is helpful for making comparisons between the microstructure of the processed base material 80 of FIGS. 6 and 7, and the unprocessed base material 80 shown here. The microstructure shows the large grain size of the annealed condition of the base material 80 before friction stir processing.

FIGS. 5 though 8 illustrate limited aspects of the present invention regarding friction stir processing.

Figure 10:
FIG. 10 is a cross-sectional view of material that has been friction stir mixed so as to include another material.

FIG. 10 is a cross-sectional view of a base material that has been friction stir mixed so as to include an additive material. In this example, a steel member 100 has been friction stir mixed so as to work in diamond particles 102 into the steel member.

Figure 11:
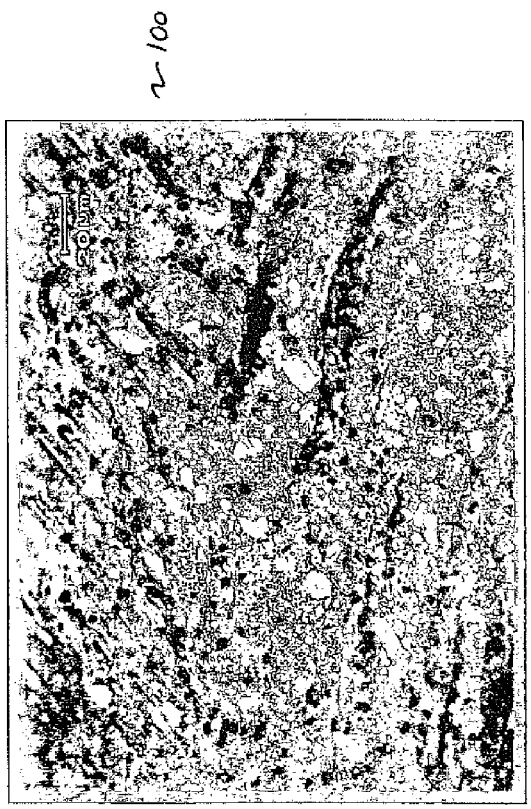
FIG. 11 is a cross-sectional view of the microstructure of the steel of FIG. 10.

FIG. 11 is a cross-sectional view of the microstructure of the steel member 100. The figure shows that the diamond particles 102 are present throughout the mixed region of the steel member 100.

Figure 12:
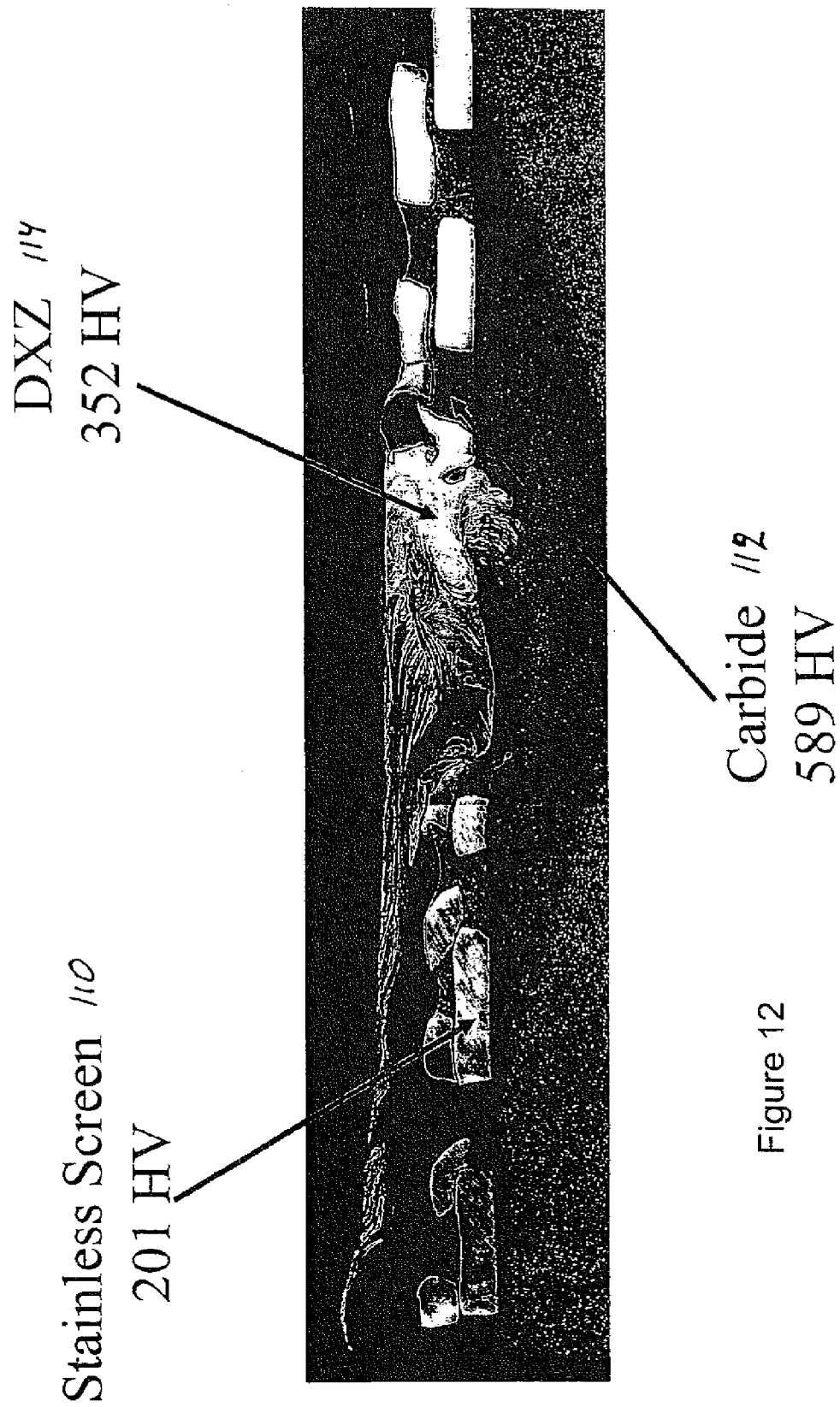
FIG. 12 is a cross-sectional view of one embodiment for friction stir mixing an additive material into another using a mesh or screen to hold the additive material in place.

FIG. 12 is a cross-sectional view of one embodiment for friction stir mixing an additive material 112 into another using a mesh or screen 110 to hold the additive material 112 in place. Specifically, a stainless steel mesh or screen 110 is being used to hold carbide 112 in the form of a powder. The screen 110 and carbide powder 112 are disposed on the surface of a base material 114. The surface of the base material 114 is then friction stir processed, resulting in a mixing of the stainless steel 110, the carbide 112, and the base material 114 at the surface of the base material. Alternatively, the different materials could be mixed further into the base material 114 using a tool having a pin, or by using a tool having a shoulder that is pressed harder into the base material.

Figure 13:
FIG. 13 is a cross-sectional illustration of the results of friction stir mixing tungsten carbide in the form of a powder into steel.

FIG. 13 is a cross-sectional illustration of the results of friction stir mixing tungsten carbide in the form of a powder into steel member 120.

Figure 14:
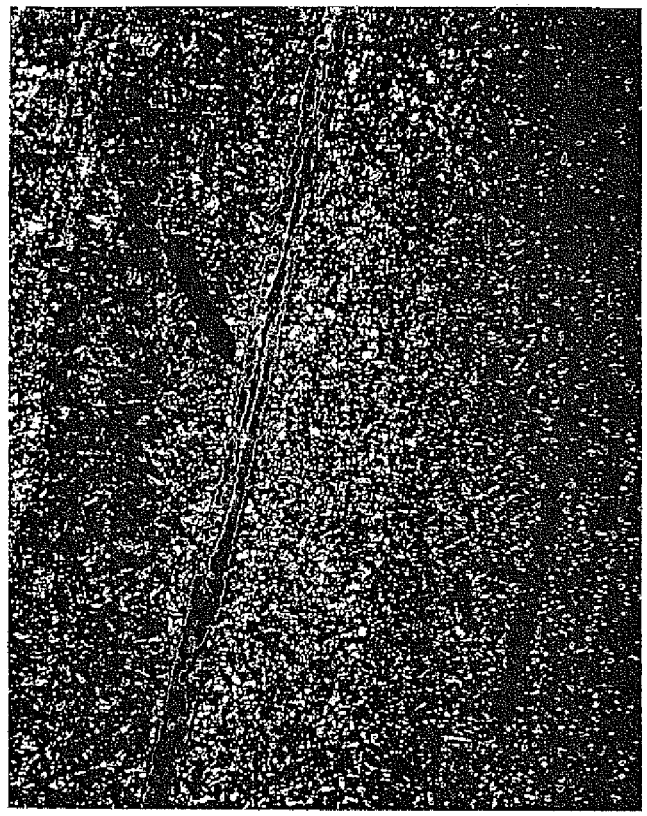
FIG. 14 is a planar view of the microstructure of the surface of the region where the steel 120 and the tungsten carbide power are mixed.

FIG. 14 is a planar view of the microstructure of the surface of the region where the steel member 120 and the tungsten carbide power are mixed.

Another aspect of the present invention is the ability to both solid state process and join at the same time. Consider two workpieces being welded together. The workpieces could be the same material or different materials. By friction stir welding the workpieces together, the resulting material can have distinctly different properties in a weld region from those of the materials that are being joined together.

As shown in FIG. 12, the embodiment shows that it is possible to introduce another material into a base material for friction stir mixing. However, the present invention should not be considered to be limited to this one design. Some other methods of introducing an additive material include, but are not limited to, entrenching a packed powder into the surface of a workpiece, sandwiching a material between workpieces to be joined together, and even using adhesives to bind the additive to the workpiece until friction stir mixed together. The adhesive can be selected so that it burns away during the friction stir mixing process, thereby not affecting the resulting mixed materials. However, it should be realized that it may be desirable to include whatever material is being used to bind an additive to a base material.

Another method of introducing an additive is through the use of a consumable tool. For example, a pin or a shoulder may be comprised of a material that will erode away into the base material. Thus, the pin, a shoulder, or a portion of a shoulder is comprised of the additive material.

The present invention can also be considered as a new means for introducing energy into materials processing. Essentially, mechanical energy is being used in a solid state process to modify a material. The mechanical energy is in the form of the heat and deformation generated by the action of friction stir processing or friction stir mixing.

Another aspect of the present invention is the ability to modify and control residual surface and subsurface stress components in a processed material. In some embodiments, it is possible to introduce or increase compressive residual stress, while in other embodiments, undesirable stresses may be reduced.

Controlling residual stresses may be particularly important in some high melting temperature materials. Friction stir processing and friction stir mixing includes contacting a workpiece with a rotating (or otherwise moving) friction stir processing or friction stir mixing tool to thereby generate a solid state processing of the material to modify stress along a surface of the material. Stress reduction should not be considered to be limited only to the surface. In other embodiments, the aspect of modifying subsurface stress is also a part of the present invention.

Some embodiments also enable a user to control heating and cooling rates by exercising control over process parameters. Friction stir processing and mixing parameters include relative motion of the tool (e.g., rotation rate and translational movement rate of the tool), depth of tool penetration, the downward force being applied to the tool, cooling rates along with cooling media (water cooling), etc.

Regarding friction stir mixing, the nature of the additive material can also directly influence the nature of the resulting processed area. Powder and diamond particles were discussed above. In an alternative embodiment, the physical structure of the additive material may affect the resulting properties. For example, fibers or other types of elongated particles can be mixed into a base material in a zone inside as well as just outside of a mixing region. In addition, additive materials can be harder or softer than the base material or other additives.

All additive materials may be selected so as to control mechanical properties such as abrasion resistance, corrosion resistance, hardness, toughness, crack prevention, fatigue resistance, magnetic properties, and hydrogen embrittlement, among others, of the base material. For example, the hard particles will be held in place mechanically, or by solid state diffusion, with greater retention than cast structures since the strength of the mixing region may or may not be greater than in the base material.

Hard particles may include tungsten carbide, silicon carbide, aluminum oxide, cubic boron nitride, and/or diamond or any material harder than the base material that will not go fully into solution at the mixing temperature (usually 100 to 200 degrees C. above the melting point of the base material). In addition, fibers may be added in the same fashion to locally strengthen the base material or add directional properties.

Additive materials may be specifically selected for the ability to go into solution in order to achieve some specific characteristic of the processed base material. Additives can also enhance toughness, hardness, enhance thermal characteristics, etc.

Another advantage of putting additives into a base material is that particles or fibers can be selected from materials that cannot be used in fusion or hard facing processing because they would go into solution during a liquid phase of the base material. In friction stir processing, eutectic compositions of the particle/fiber with the base material can be avoided so that dual properties can be achieved. The introduction of the particle/fiber into the base material can be varied to tailor different properties within a given workpiece.

For example, a tool with a long pin can be used to stir particles/fibers to a deeper depth and then a second tool with a shorter pin can be used to stir a different particle/fiber at a different depth to form layered features in the base material. Geometry of a mixing region, particle/fiber composition, particle/fiber size, particle/fiber distribution and location within the base material can provide engineered wear and strength features to a given object.

A friction stir processing tool similar to the tool shown in FIG. 2 can be used to create new materials and modify existing materials. For example, elements in powder form can be placed in a mold. The tool 10 can be rotated and plunged into the powder to generate heat. As the tool 10 is traversed through the powder, solid state diffusion occurs to join the powder into a solid form with the base material. Likewise, a groove can be cut in a material and filled with powder having a mixture of elements and then friction stir processed to mix the materials together.

Alternatively, material can be added directly to the surface of the material, or it can be sandwiched between two pieces of material such as steel, and then friction stir processed to join the materials together. Other methods can also be used to accomplish mixing of materials together in friction stir mixing.

When friction stir mixed, the powder is mixed with the base material by friction stir mixing to form a material having modified properties in the stir region. In selected embodiments, the process creates little heat generation and has low energy input, requires a very short time at temperature, will generally have fewer solidification defects, and can be fully automated. Advantageously, one or more embodiments need minimum post-processing inspection due to the solid state nature and extreme repeatability of the processing.

The processing method is tolerant to interface gaps and as such little pre-processing preparation, there is no material spatter to remove. The post-processing surface finish can be exceptionally smooth in selected embodiments with very little to no flash. Unlike other processes, the friction stir processing performed in accordance with some embodiments of the present invention can be done with little to no porosity, oxygen contamination, or distortion. Furthermore, friction stir processing can be performed in a controlled gas or liquid environment.

Elements, alloys, metals, and or other material types can be processed in solid form, powder form, fiber form, plate form, as wire, or in a series of composite compositions. In some embodiments, new materials can now be designed without concern for liquid phase problems.

FIG. 15 shows some examples of how material characteristics for steels and other base materials can be affected by friction stir processing or friction stir mixing additive materials in.

FIGS. 16 through 84 are illustrations showing equipment, tools, or components that the inventors have identified as benefiting from application of friction stirring in accordance with aspects of the present invention. In other words, by friction stirring (i.e., friction stir welding, friction stir processing, or friction stir mixing) surfaces or surfaces and subsurfaces of materials used to form components or parts of tools or equipment in industrial applications, significant material, mechanical, performance and/or cost benefits can be achieved over the prior art as described above.

Those, skilled in the art will appreciate that for smaller components or parts considered for friction string, precision friction stirring tools can be developed and used. For example, smaller pin configurations may be used to treat or penetrate surfaces of smaller items or to providing friction stirring along restricted paths where a very specific area of interest is to be treated.

The items illustrated in FIGS. 16 through 84 include, in alphabetic order, a ball bearing and ball bearing race, a bearing reamer, a bit-insert roller cone, a blow-out preventor, a bridge plug, a button bit, a casing scraper, a centrifugal pump, a centrifugal degasser, a centrifuge to process drilling, completion and workover fluids, a choke, a cylindrical bearing, a desander, a desilter, a diaphragm pump, a vein pump, a downhole drilling motor-mud motor, a downhole turbine motor, a drag bit, a drill collar, a duster dryer, a fishing jar, a fishing milling cutter, a fixed cutter bit, a gate valve, a hole opener, a hole enlarger, a hydraulic pipe cutter, a hydraulic piston, a kelly, drill-pipe, a mechanical casing cutter, a metal to metal seal, a mill starter, a mud cleaner, a mud-gas separator, a multilateral junction, a needle bearing, an overshot, a packer, a PDC bit, a percussion bit, a reamer, a roller cone bit, a roller cone bit showing a ball hole plug and a journal bearing, a roller cone bit leg, a rotary table, a rotating drill head, screens, a shaker, a spear, a spherical bearing, a stabilizer, subs, a subsea gate valve, a tapered bearing, taps, an under reamer, valves and seals, a cuttings dryer, and a wellhead Christmas tree. No importance should be given to the order in which the items are shown.

Other applications are found in the construction industry. Specifically, many pieces of heavy equipment or equipment used in cutting, drilling, moving and any other aspect of construction or mining work can also benefit from the embodiments of the present invention. A few examples include the blade on a bulldozer, an asphalt remover, and long-wall mining equipment. The list above is indicative of the extreme diversity of applications of the present invention.

While the lists above are certainly extensive, they are not and should not be considered to be limited only to those items specifically identified. There are other pieces of equipment and components that may be found to perform similar functions that can also benefit from the friction stirring of the component itself, the surface of the component, or just a portion of the component or the surface thereof.

In view of the various examples and descriptions provided above as well as other documents incorporated by reference, it will be apparent to those skilled in the art that aspects associated with the present invention may be applied to any cutting blades, sealing surfaces, bearing surfaces, wear surfaces, and impact surfaces of components, parts, tools, and equipment noted above, shown in the figures, or known in the art to include such elements or surfaces. In one or more embodiments, such surfaces or elements are formed of metal matrix composites, ferrous alloys such as steel and stainless steel, and non-ferrous materials, superalloys, nickel, iron-nickel, and cobalt-based alloys, chromium, molybdenum, tungsten, aluminum, titanium, niobium, tantalum, and rhenium, and processed using one or more methods described above.

Some examples illustrating details of particular embodiments are provided as follows. Seal life and performance can be a limiting factor in roller cone bit life. When the seal fails, the bearing systems are subjected to the dynamic environment of mud and other contaminants. Once this occurs, bearing failure is imminent and rapid. Roller cone bit seals are traditionally made of rubber. A significant drawback of the standard rubber seal is that it is a static seal in a dynamic environment. It is desirable to have enough elasticity within the rubber material so that the seal can be installed in compression. This enables the rubber seal to expand but continue to provide a seal as the seal material wears away.

Seals are also a high friction component. For example, a metal-to-metal seal provides many properties that address the requirements of such a dynamic seal over that of a rubber-based seal that has improved wear resistance, low friction, compressibility, expandability, and thermal conductivity.

By using the new friction stir processing tool materials and designs, it is possible to create a solid state seal material using diamond and/or Wc-Co particles, or any of the elements, or use friction stir processing to condition the base material without disposing additives into it. Current and existing seal configurations can be modified and engineered by mixing different materials to achieve desired properties (i.e. hardness, toughness, thermal conductivity, friction, corrosion, etc.). The mix can use particles, grains, fibers, and/or any of the elements to create a new solid state seal material using friction stir processing methods. Grooves could be placed in the seal surface to act as a mold to hold the mixtures or starting powders to perform the solid state friction stir processing.

These new material seals (created from friction stir processing of the material by itself, or by mixing the material with Wc-Co, diamond, CBN additives) can be precision finished to tight specifications. The matched seals, such as those shown in FIG. 53, are then installed in a state of compression within the bit. The new material properties would be able to withstand high compression loads, and have a high thermal conductivity due to the diamond that was mixed into the seal material which enables rapid transfer of frictional heat away from the seal surface. In addition, the diamond and/or other elements that can be mixed into the seal material will have high wear resistance and lower friction which are desired properties. Even the original non-additive friction stir processed steel will have extremely high hardness and toughness.

Because the new seal material can withstand high compression and has high wear resistance, it should have an extended life. However, even when slight wear is experienced by the seal, the high compression of the material will allow for expansion during use, thus maintaining a tight seal.

Figure 85:
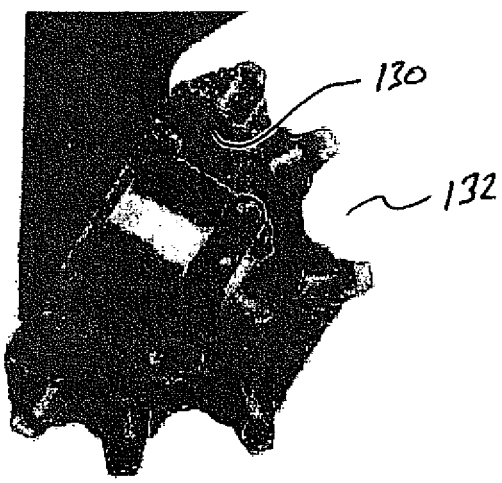
FIG. 85 is a cut-away illustration of the seal gland area of the journal and steel roller cone bit.

In addition to the metal-to-metal seal surfaces, there is another location that can benefit from an improved seal. Specifically, the seal gland area of the journal and steel roller cone bit can be friction stir processed. The seal gland area 130 is shown in FIG. 85. In the seal gland in a rotating cone on a roller cone bit, an elastomer seal or O-ring is typically compressed between the journal and the cone seal gland. These two concentric surfaces provide a minimum amount of contact pressure for a given amount of "squeeze" on the seal in the gland. For the first substantial portion of the operating lifetime of the bit (cone-journal) the sealing elements are compressed, between the surfaces, to withstand pressure differentials and prevent debris from entering the internal surfaces and bearing structures within the cone. After extended use the sealing element is degraded by wear and other factors, and the seal and sealing pressures deteriorate. Much of the lifetime of the gland-seal system is dependent upon the elastomer and gland wear.

With friction stir processing it is possible to shift the performance of the seal-gland system away from the elastomer seal to the mating surfaces that have been friction stir processed. The mating surfaces will now have extremely high wear resistance due to the changes in micro-structural properties. Rather than building precision gland and journal surfaces for an elastomer seal or wiper, the bulk cone material can be processed on both the journal and the internal cone surfaces and then subsequently machined as either mating surfaces to run against each other or to be prepared for an elastomer seal in the machined gland area. In both of these circumstances, the wear and toughness properties of the friction stir processed surfaces are improved, thereby giving longer life to the seal gland system or mating seal surfaces.

In an alternative embodiment, another method of accomplishing a similar result would be to externally friction stir process a hard metal sleeve set that can be machined and then fit into the cone and/or journal surfaces. This alternative embodiment will enable ease of fabrication and setups external to the cone and journal surface. More specifically, these systems would allow either gland areas for actual seals that extend the wear resistance of the glands or as mated surfaces that create a seal due to the very high wear resistance that results from the friction stir processed microstructures.

In these embodiments above, the friction stir processing can be extended beyond the seal gland area inside the cone to the outer skin or "heel" area of the cone resulting in strongly enhanced materials properties to further protect the cone and seal/gland areas from erosion and wear.

In FIG. 85, the cone 132 is utilizing a metal-to-metal seal system that has been friction stir processed as described above. The same process can be applied to achieve an improvement in performance and/or life cycle of the seal gland/wiper area as explained above.

In another example of the embodiments of the present invention, in many drilling applications where high speed, directional, and/or abrasive environment conditions exist, metal hard-facing is typically applied liberally to the shirt-tail portion of a roller cone bit leg and extends up to the leading edge of the bit leg to protect it from wear and eventual breakdown and wear of the internal seals and bearings. This hard-facing is usually made up of tungsten carbide particles. The problems associated with hard-facing are based on the cast structure that is formed. The cast structure results from a liquid phase that has solidified to hold in place hard particles required for abrasion resistance. The cast structure is subject to high residual stresses, solidification defects, and brittle composition of undesirable phases that precipitate into the solidified structure resulting in cracking, voids, and lack of adhesion to the base material.

By utilizing the new solid state friction stir processing of the material itself, or mixing in additives (diamond, WC-Co, and/or other elements) on the shirt-tails of the roller cone bits, a much tougher, more wear resistant, and more stress-free material can be achieved, and most likely at a lower cost.

In the embodiment where friction stir mixing is performed to put additives into a material, the starting powders could, for example, be deposited in a notch that is formed in the shirt-tail in the areas most in need of wear resistance, etc. Friction stir mixing would be used to create the new material for high wear resistance and protection of the shirt-tail area.

The examples described in the embodiment above have described the processing of components and surfaces of a roller cone bit. However, it is an aspect of the present invention that any surfaces or components on a diamond and/or PDC shear bit can be improved where erosion, wear, and/or toughness are issues in the life and breakdown of a bit. The principles of the present invention can be applied to areas such as fluid erosion areas on the surfaces of the bits, wear surfaces on the bits that are typically protected by use of gage pads, and nozzle areas to mention a few.

In addition, it is another aspect of the present invention that cutting structures used on both the roller cone bits and on the PDC bit could be enhanced by friction stir processing or friction stir mixing to maintain wear resistance and provide improved toughness.

Figure 86:
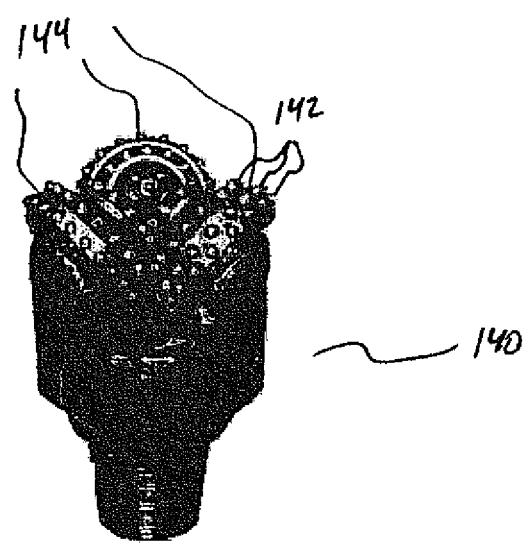
FIG. 86 is a perspective view of a mill tooth roller cone bit.
Figure 87:
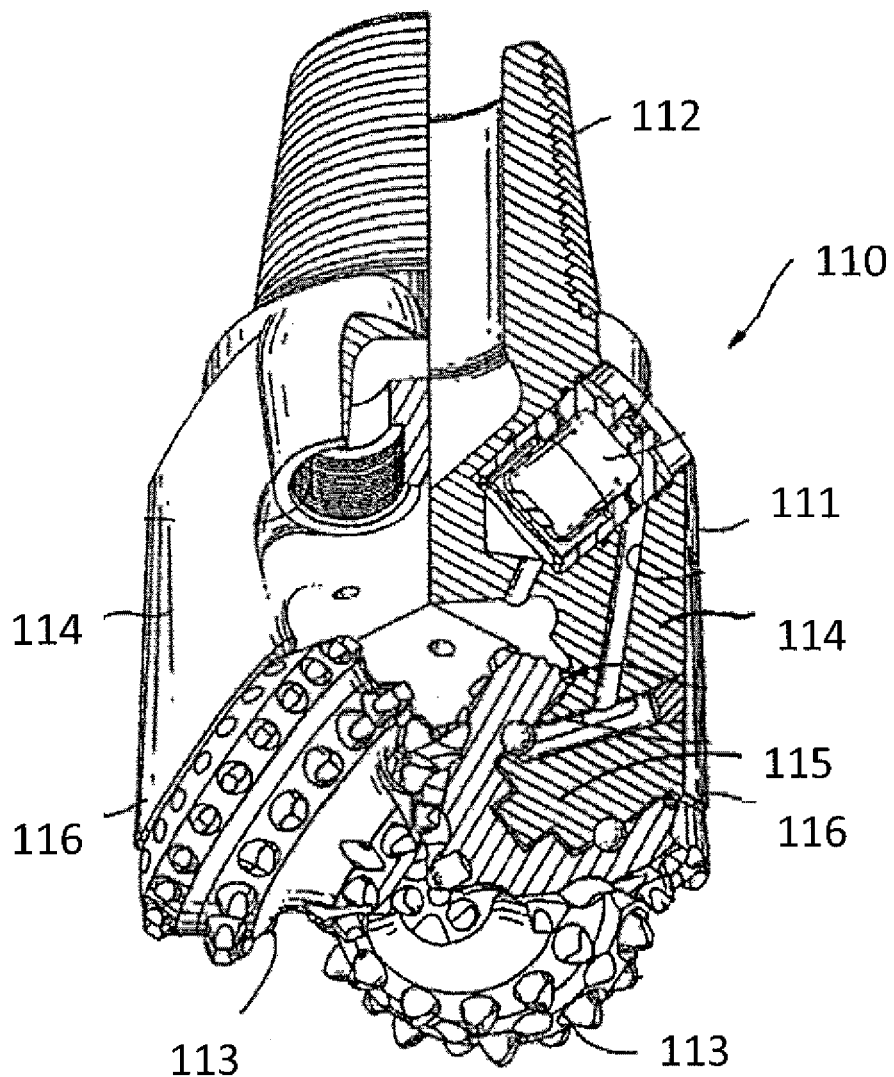
FIG. 87 is a conventional roller cone drill bit.
Figure 88:
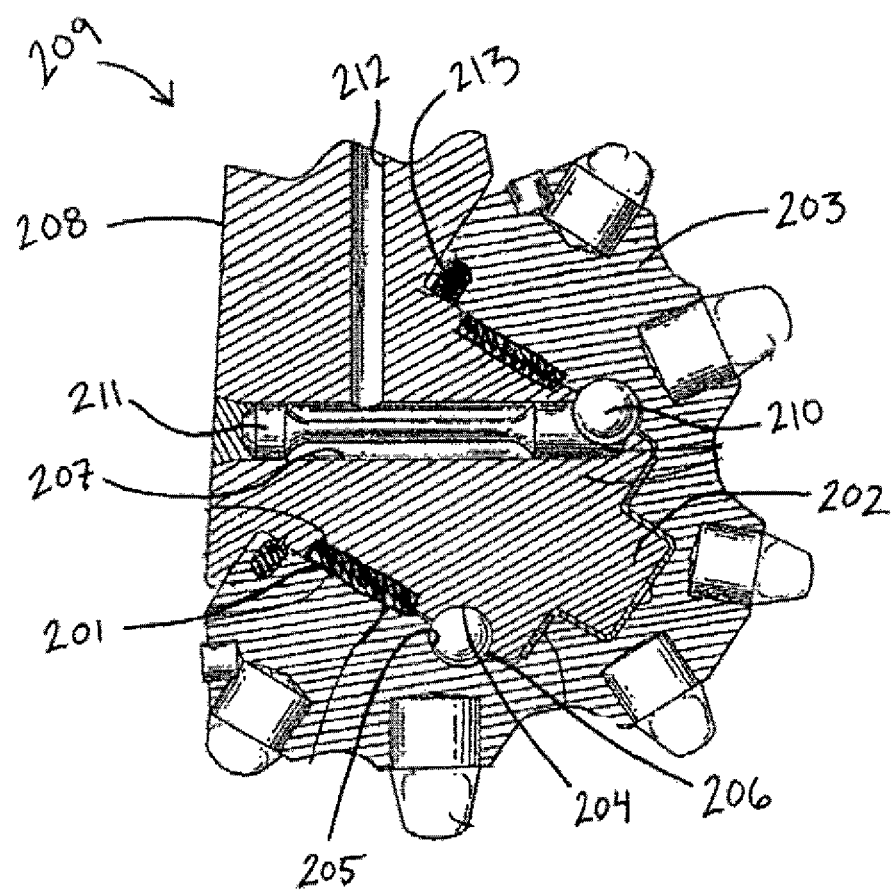
FIG. 88 is a conventional ball bearing system of a roller cone drill bit.

For example, the present invention can be applied to enhance life cycle and/or performance of steel teeth 142 found on a mill tooth roller cone bit 140 as shown in FIG. 86. Instead of using the conventional manual hard-facing technique and material that is applied to the teeth of the mill tooth bit, the steel teeth 142 can be friction stir processed by them, or additives such as Wc-Co, diamond, CBN, and/or other elements could be mixed in using friction stir mixing.

It is observed that on the roller cone bit such as the one shown in FIG. 86, there are typically three rolling cones 144. All three of these cones 144 are made of steel. On the outside of the steel cones 144 there are either steel teeth 142 that are metal hard faced for high wear resistance or there are TCI (Tungsten Carbide Inserts) or DEI (Diamond Enhanced Inserts) used as the wear resistant teeth that are press-fit into holes drilled into the cone. The steel teeth 142 or TCI/DEI are the primary cutting and wear structures. These and all other areas of the steel cones 144 could benefit from friction stir processing or mixing. For example, the refined grain structure has high hardness and toughness to resist mechanical and erosion wear. The refined structure can hold particles, such as diamond, with greater strength than any solidified material (i.e. hard-facing second phase) that has formed a cast structure. Examples of areas that may benefit strongly from this surface processing would include the outer heel row of the steel cone as well as the steel cone areas between cutting structures where erosion and wear are experienced.

On the inside of the steel cones 144 are other surfaces used for ball, roller, or other bearing surfaces including races that would benefit from the new solid state FSP material and/or process. The internal moving and stationary systems and surfaces such as bearings, races, and seal surfaces could be improved significantly by taking advantage of the properties of the new solid state material and/or process (i.e. friction, thermal conductivity, wear resistance, etc.).

In another embodiment of the present invention, a cone is attached to each of three legs and journal bearings of a roller cone bit. On the outside of the shirt-tail area a hole is drilled in the leg to insert balls for the ball bearing design. These balls assist in the rotation and rolling of the each of the cones under tremendous torsional loads that are applied to the drill string. Once the balls are placed into the ball hole a plug is then inserted and welded in place to secure the ball bearing package. The weld joint at this location is of utmost importance. In fact, in many cases the "ball hole plug" has additional hard facing and even Wc-Co inserts and wear pads that are put around the ball hole plug weld to protect it from wear and erosion, which if it occurs, will allow the plug to fail and the bit will ultimately experience failure.

As discussed in greater detail below, the ball hole plug can be secured using by friction stir processing or friction stir mixing to apply a coating with diamond and/or Wc-Co or other elements. In addition to providing a secure weld, friction stir processing and mixing provide a natural wear resistance to prevent abrasive and erosive wear due to the environment.

In another example, FIGS. 34 and 35 illustrate downhole motors that are used for drilling oil. There are turbine powered motors as shown in FIG. 35 and downhole mud motors shown in FIG. 34. Both of these types of motors are subjected to very harsh drilling conditions and environments. These motors use a series of components that are designed and engineered to resist wear, erosion, and corrosion due to these harsh environments. Such components are thrust bearings, turbine blades, rotors, stators, and impellers etc. Companies have been built for the sole purpose of improving drilling power efficiency and dependability and to extend the costly intervals between trips in wells of rapidly increasing depths and profile complexity.

Down hole turbine motors and mud motors have so many moving and working parts that depend on the properties of hardness, wear resistance, toughness, lubrication, corrosion resistance, friction, and stress management. The potential for any of these weak links to have the properties improved upon by the principles of the present invention is great. In many cases very expensive components may be replaced by means of the new material and process.

Generally, embodiments disclosed herein also relate to securing a ball hole plug to a roller cone drill bit leg. In particular, embodiments disclosed herein relate to securing the ball hole plug using friction stirring. Embodiments of the present disclosure related to securing the ball hole plug may also relate to improvements in assembly of the ball hole plug into the ball hole by fitting a shaped plug into a corresponding shaped ball hole prior to friction stirring.

As discussed above, friction stirring is a process by which frictional heat plasticizes, mixes, and forges metal, metal alloys, and other materials. Friction stirring uses a combination of rotational and directional motion applied to the surface of an object to be treated. A rotating member is conventionally applied to the surface that is to be friction stirred and is moved in a particular direction until a plasticized state of the material is achieved. The rotating member is moved along the surface to treat the material by changing the material microstructure. Friction stirring includes friction stir processing, friction stir mixing, and friction stir welding (FSW). Friction stir processing is a treatment process, which generally involves engaging two or more previously adjoined materials (i.e., previous weld) to strengthen or improve the weld characteristics. Alternatively, friction stir processing may refer to treating a single material of a workpiece. FSW involves engaging two or more adjoining materials to form a weld.

Figure 89A:
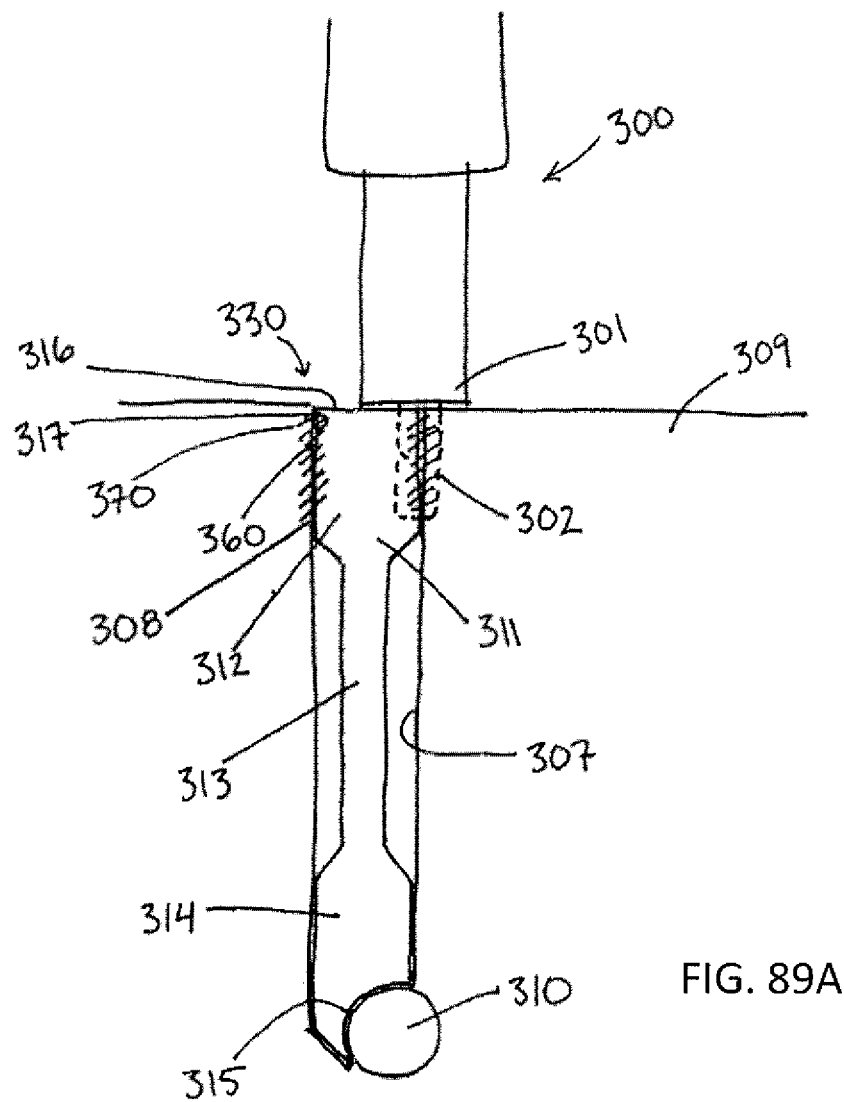
FIGS. 89A and 89B show a ball hole plug friction stir welded to a bit leg.
Figure 89B:
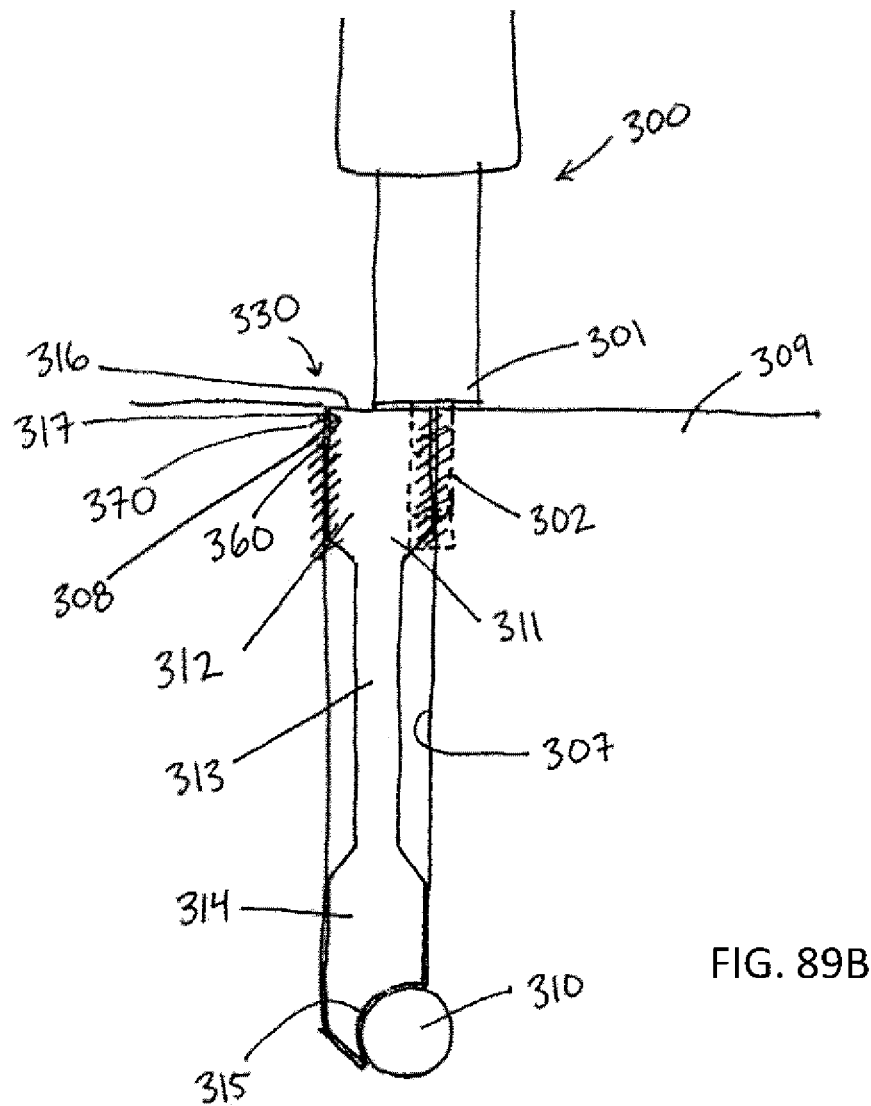

In one embodiment of the present disclosure, as shown in FIGS. 89A and 89B, a ball hole plug 311 is friction stir welded to the leg back face 309. A tool used for friction stirring is characterized by a generally cylindrical tool 300 having a shoulder 301 and a pin 302 extending downward from the shoulder. The pin 302 is rotated as force is exerted to urge the pin 302 and a workpiece 330 together. The workpiece 330, in FIG. 3A, includes the ball hole plug 311, the back face of the leg 309, and an interface 360 between the ball hole plug 311 and the leg 309. Frictional heating caused by the interaction between the rotating pin 302 and the workpiece 330 causes the workpiece material to soften without reaching the melting point of the material, which results in plasticization of the workpiece material. Once sufficient heat is generated, the pin 302 is plunged into the workpiece 330 through the interface 360. The tool 300 is then moved along the workpiece 330, plasticizing the workpiece material as it flows around the pin 302. The friction stirring tool 300 is moved along the interface 360 in such a manner that the pin 302 presses into the interface 360 at an orientation that is co-planar with the interface 360 between the two materials. The result is a solid state bond 370 between the ball hole plug 311 and the leg 309. Friction stir welding does not require a solder or filler material to form a bond, but the use of an additional material is not necessarily outside the scope of the present invention. Additional material may be used, for example, to add corrosion inhibitors, wear resistant material, and other material enhancing properties.

The resulting solid state bond of a friction stir weld is an inter-metallic atomic bond formed by mechanical deformation. A solid-state bond differs from bonds formed by conventional welding techniques (i.e., welds resulting in a fusion bond or solder or braze bond) in that conventional welding techniques include melting the welding material and then cooling the material to form a bond. The high rates of heating and cooling during conventional welding may result in non-uniformity throughout the microstructure of the welded material, which may create different strain rates and increased stress within the welded material. A solid state bond, on the other hand, does not require the workpiece material to melt. Thus, more uniformity of the microstructure, and better mechanical properties of the welded material may be achieved. For example, a solid state bond may have substantially no metallurgical discontinuities, including minimal or no porosity.

Referring back to FIGS. 89A and 89B, the ball hole plug 311 comprises a plug head 312, a plug body 313, and a ball retainer end 314. The plug head 312 comprises a top surface 316 and a side surface 317. The plug head top surface 316 is flush with the back face surface of the leg 309, and the plug head side surface 317 fits against the ball hole wall 307, at the opening portion 308 of the ball hole, to create the interface 360 between the ball hole plug 311 and the leg 309. However, the plug head 312 may initially protrude from the back face surface of the leg 309 in order to have a flush surface with the leg back face after friction stirring. The ball retainer end 314 has a concave surface 315 with a radius of curvature that mates with a corresponding radius of curvature of the cone retention balls 310.

Generally, ball hole plug heads 312 are cylindrical in shape. However, it is within the scope of the present disclosure that the plug head 312 may be cylindrical or non-cylindrical in shape. When the plug head 312 is cylindrical in shape, it may be difficult to orient the ball hole plug 311 in such a manner that the plug retainer end 314 configures exactly to the cone retention balls 310. However, in accordance with various embodiments of the present disclosure, the ball hole 307 is formed in a shape corresponding with a non-cylindrical plug head 312. The corresponding shapes are oriented in a position that secures the retainer end 314 in configuration with the cone retention balls 310 when the plug head 312 is inserted into the ball hole 307.

Any non-cylindrical shaped plug head and corresponding ball hole is within the scope of the present disclosure, including, for example, an oval-shaped plug head, a plug head with at least one flat side, a triangular-shaped plug head, a rectangular plug head, etc. Additionally, the plug head may be non-symmetrical in shape, such that the plug head has a notch, a protrusion, or other variation from the general shape of the plug head.

As shown in FIG. 89A, the pin 302 may be plunged to a depth in the workpiece 330 such that part of the interface 360 is friction stir welded. Alternatively, as shown in FIG. 89B, the pin 302 may have sufficient depth so as to friction stir weld the entire height of the ball hole plug head 312. Friction stir welding the workpiece such that the entire plug head 312 is completely consumed may yield a reduced subsurface notch affect at the weld root. A reduced subsurface notch affect may be desirable because the notch affect can promote failure by allowing fatigue crack initiation sites. However, depending on the geometry of the plug head, the entire head may not be consumed. For example, rather than friction stirring the entire plug head 312, only the joint interface 360 around the plug head may be friction stirred. Furthermore, it is within the scope of the present disclosure that the diameter of the pin 302 may be smaller, larger, or equal to the diameter of the plug head 312. Likewise, the shoulder 301 may be smaller, larger, or equal to the diameter of the plug head 312.

Large forces may be exerted between the pin and the workpiece in order to apply sufficient pressure to the workpiece to cause plasticization of the material. For example, for friction stir welding an aluminum alloy workpiece of ¼-inch thickness, forces of up to 4000 pounds or more may have to be exerted between the pin and the workpiece. Where the workpieces have sufficient structural strength and rigidity, some of the force may be absorbed by the workpieces themselves.

Furthermore, FIGS. 89A and 89B show a friction stirring tool 300 positioned at an orientation that is co-planar with the interface 360 between the ball hole plug head 312 and the leg 309. However, in accordance with another embodiment of the present disclosure, the friction stirring tool may be moved along an interface in such a manner that the pin is oriented perpendicular to the interface plane. For example, a layer of wear resistant material may be applied to the outer surface of a drill bit, thereby creating an interface perpendicular to the pin. Depending on the component being friction stirred and its configuration, one skilled in the art would appreciate that either orientation of the tool may be used.

The ball hole plug and the bit leg may be formed from the same material, or alternatively, they may be formed from dissimilar material. Further, the ball hole plug may be formed from material with a higher yield strength and toughness than the leg material. The ball hole plug and leg may be formed from material selected from, for example, at least one of the following: austenitic steel, carbon steels, low alloy carburizing steel, high alloy carbon steel, and high alloy materials. High alloy materials include, for example, iron-, cobalt-, or nickel-based materials, which may be used for higher strength or improved corrosion resistance. Additionally, the ball hole plug material may be subjected to different processing conditions than the leg material. For example, the ball hole plug material may be annealed or heat treated to have the same hardness as the leg material.

Furthermore, additional material may be added to the friction stirring process, so as to control mechanical properties of the resulting workpiece material, including one or more of the following unique properties: improved corrosion resistance, higher toughness or equivalent toughness, higher hardness, fatigue resistance, crack resistance, minimal or no significant heat affected zone, and higher yield strength and wear resistance than the base material used in a drill bit. In one embodiment of the present disclosure, an additive material is friction stirred into the roller cone drill bit leg, including over the ball hole plug weld to increase wear resistance. For example, an additive material may be applied by conventional methods to hardface the outer surface of a drill bit. The hardfacing may then be treated using the friction stirring methods disclosed herein, depending on the desired material properties for the particular application, such as hardness, toughness, casing-friendly wear resistance, etc.

Additive material may include, for example, metal matrix composites, ferrous alloys such as steel and stainless steel, non-ferrous materials such as aluminum, aluminum alloys, and titanium, super alloys such as nickel, iron-nickel, and cobalt-based alloys generally suitable for use at temperatures above 1,000 degrees Fahrenheit, and air hardened steels. These materials may be described as "high melting temperature compounds," or compounds having a melting temperature greater than steel. Additional elements in the types of materials that may be friction stirred include, but are not limited to, diamond, tungsten carbide, chromium, molybdenum, manganese, silicon, carbon, boron, tungsten, aluminum, titanium, niobium, tantalum, vanadium, nickel, cobalt, zirconium, phosphorus, and rhenium.

Additive materials may be applied to the back face of a drill bit leg, including over the ball hole plug weld by any means known in the art, as described in U.S. patent application Ser. No. 12/629,366, which is filed concurrently herewith and is incorporated by reference in its entirety. For example, additive material may be applied as hard particles, as a tape, or as a plate to the leg base material prior to friction stirring. Methods of application include: thermal spraying, plasma spraying, using adhesives to bind the friction stirring material to the base material, entrenching a packed powder into the surface of the base material, sandwiching a first friction stirring material between the base material and a second friction stirring material, etc.

Alternatively, the additive material may have been welded to a base material using a variety of conventional techniques, such as GMAW (gas metal arc welding), GTAW (gas tungsten arc welding), PTA (plasma transferred arc), FCAW (flux cored arc welding), etc. Due to the phase transformations (to liquid state, then cooled to a solid state) that occur during such conventional techniques, the microstructure can possess undesirable characteristics, such as precipitation of unwanted phases or structures, grain growth, and residual stresses. Thus, one or more thermal treatments may have been performed on the welded material (including pre- and/or post-heat treatments) to relieve some of those residual stresses and minimize cracking. In accordance with embodiments of the present disclosure, the additive material may subsequently be friction stir processed to achieve an improved fine-grained microstructure (with improved material properties).

In one embodiment of the present disclosure, a plate may be friction stir welded to the back surface of a drill bit leg and cover the ball hole. The plate may comprise nickel or stainless steel alloys, high strength steel alloys, or any air hardenable steel, including D2 and A2 steel, or alloy steels such as 4815, 9313, and 8720 steels. In such an embodiment, the ball hole plug may be welded (by conventional means or by friction stir welding) to the leg prior to friction stir welding the plate to the leg, or alternatively, the ball hole plug and the plate may be friction stir welded to the leg during a single friction stirring process. However, while the leg may be friction stirred prior to or after assembly of the drill bit, the ball hole plug must be welded before the drill bit, in particular the multiple leg forgings, is assembled. Thus, if a plate is to be friction stir welded after assembly of the drill bit, the ball hole plug must have been welded to the leg prior to welding the plate to the leg.

Friction stir welding typically leaves lower asperity heights and results in a smoother finish than conventional welding techniques. However, a friction stirred surface may have a depressed surface height, i.e., a keyhole, at the location where the friction stirring tool was removed from the workpiece. Depending on the application of the workpiece being friction stirred, a keyhole may be left in the workpiece, the keyhole may be filled, or the keyhole may be diminished by certain tool removal processes. In one embodiment of the present disclosure, a keyhole is left in the ball hole plug material upon removal of the friction stirring tool. In another embodiment of the present disclosure, a gradual removal process is used to minimize the occurrence of a keyhole at the point of exit. The gradual removal process includes: beginning the removal of the friction stirring tool at an initial location in the workpiece; gradually pulling the friction stirring tool out of the workpiece as the tool is moved a distance away from the initial removal location; and finally, completely removing the friction stirring tool at a distance from the initial position. The removal process may also be aided by use of a secondary, sacrificial material onto which the friction stirring tool may be pulled, to minimize the effect of the tool removal on the leg.

Using the friction stir treatment methods of the present disclosure, the solid-state processing principles associated with friction stirring, may likely reduce the microstructure defects present in the original weld or deposit, reducing the incidence of cracking. By reducing the incidence of cracking, the need for additional heat processing treatments, such as pre- and/or post-heat treatments may be eliminated. Moreover, the processing technique may be less hazardous, which may also allow for friction stirring at any given location, including at the rig site, allowing for better rebuild service. Another byproduct of the friction stirring techniques of the present disclosure may be a reduction in the surface roughness, i.e., reduced asperity heights, as compared to a conventional weld. Lower asperity heights result in a smoother finish, which reduces an apparent need for surface finishing or grinding.

In addition to the above mentioned benefits of friction stirring over conventional welding techniques, a greater hardness of the friction stirring material may be achieved without losing toughness. Specifically, friction stirring results in materials having a refined grain microstructure. Refined grain microstructures provide the friction stirred material with both increased toughness and increased strength, as well as increased corrosion resistance, and other favorable material characteristics. Conventional welding, on the other hand, generally results in materials having an inverse relationship between strength and toughness (toughness decreases as strength is increased).

Increased hardness depends on the material composition and type of material being friction stirred. The bit leg material is generally made of low alloy carburizing steels, such as 4815, 8720, 4718, and 9313. However, other materials, such as 4130, 4145, and other alloy steels, may be used as bit leg material. Friction stirring 4815 steel that has been heat treated to have a hardness of 36-40 HRc may yield a hardness increase of 5-10 HRc. However, friction stirring 4140 steel or 4130 steel, for example, may result in an increased hardness of 20 HRc or more. Such improved hardness may result from the change in the material microstructure (i.e., through grain refinement/recrystallization to produce fine precipitates such as carbides). Further, friction stir welding a ball hole plug to a bit leg may result in the weld strength being higher than the strength of the parent material (the original material being friction stir welded).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for retaining a roller cone on a bit leg, comprising:
   mounting a roller cone on a journal extending downward from the bit leg;
   inserting a plurality of retention balls into a ball hole extending through a leg back face to the journal;
   inserting a ball hole plug into the ball hole;
   covering the ball hole plug with a plate; and
   friction stir welding the ball hole plug and the plate to the leg back face.

2. The method of claim 1, further comprising providing an additive material and friction stir mixing the additive material into the bit leg.

3. The method of claim 1, wherein the ball hole plug is friction stir welded to the bit leg prior to friction stir welding the plate.

4. The method of claim 1, wherein the ball hole plug comprises a non-cylindrical head and the ball hole is non-cylindrical near the back face of the bit leg.

5. The method of claim 1, further comprising welding a plurality of bit legs together.

* * * * *